(12) United States Patent
Tanzil et al.

(10) Patent No.: US 12,452,119 B2
(45) Date of Patent: Oct. 21, 2025

(54) METHOD AND DEVICE(S) FOR SUPPORTING MACHINE LEARNING BASED CREST FACTOR REDUCTION AND DIGITAL PREDISTORTION

(71) Applicant: Telefonaktiebolaget LM Ericsson (publ), Stockholm (SE)

(72) Inventors: S M Shahrear Tanzil, Ottawa (CA); Ashim Biswas, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 73 days.

(21) Appl. No.: 18/277,318

(22) PCT Filed: Feb. 22, 2021

(86) PCT No.: PCT/SE2021/050147
§ 371 (c)(1),
(2) Date: Aug. 15, 2023

(87) PCT Pub. No.: WO2022/177482
PCT Pub. Date: Aug. 25, 2022

(65) Prior Publication Data
US 2024/0137258 A1 Apr. 25, 2024

(51) Int. Cl.
*H04L 5/12* (2006.01)
*H03F 1/32* (2006.01)
(Continued)

(52) U.S. Cl.
CPC ....... *H04L 27/2623* (2013.01); *H03F 1/3252* (2013.01); *H03F 3/245* (2013.01); *H04L 27/367* (2013.01)

(58) Field of Classification Search
CPC . H04L 27/2623; H04L 27/367; H03F 1/3252; H03F 3/245; H03F 2200/451;
(Continued)

(56) References Cited

FOREIGN PATENT DOCUMENTS

| CA | 2842006 A1 | 1/2013 |
|---|---|---|
| CN | 111988254 A | * 11/2020 |

(Continued)

OTHER PUBLICATIONS

International Search Report and Written Opinion of the International Searching Authority, PCT/SE2021/050147, mailed Oct. 26, 2021, 12 pages.
(Continued)

*Primary Examiner* — Helene E Tayong
(74) *Attorney, Agent, or Firm* — Sage Patent Group

(57) ABSTRACT

Method and device(s) for supporting performance of machine learning based CFR and DPD on multiple digital input signals relating to different frequency bands, respectively, in order to signal condition said signals before power amplification and subsequent transmission in said frequency bands by a wireless communication network. The device(s) obtain said multiple digital input signals as complex valued signals. The device(s) perform feature construction that takes said multiple digital input signals as input and provides constructed feature signals according to predefined constructed feature types as output. Said predefined constructed feature types relate to at least the following per complex valued sample of the obtained complex valued multiple digital input signals the real part of the sample, the imaginary part of the sample and at least one of the absolute value of the sample and the phase of the sample.

18 Claims, 24 Drawing Sheets

(51) Int. Cl.
- H03F 3/24 (2006.01)
- H04L 27/26 (2006.01)
- H04L 27/36 (2006.01)

(58) Field of Classification Search
CPC .. H03F 2201/3206; H03F 1/3247; H03F 3/19; G06N 3/044; G06N 3/045; G06N 3/08; G06N 20/00
USPC .......................................................... 375/262
See application file for complete search history.

(56) References Cited

FOREIGN PATENT DOCUMENTS

| WO | 2013014551 A1 | 1/2013 |
|----|---------------|--------|
| WO | 2014188293 A2 | 11/2014 |
| WO | 2019231381 A1 | 12/2019 |
| WO | 2022071837 A1 | 4/2022 |

OTHER PUBLICATIONS

Benosman, Meryem M. et al., "Low Complexity Neural Network Based Digital Predistortion for Memory Power Amplifiers," Mobile, Secure, and Programmable Networking, Jan. 20, 2021, 15 pages.

Wang, Siqi et al., "Augmented Iterative Learning Control for Neural-Network-Based Joint Crest Factor Reduction and Digital Predistortion of Power Amplifiers," IEEE Transactions on Microwave Theory and Techniques, vol. 68, No. 11, Nov. 2020, 11 pages.

Zayani, Rafik et al., "Ping-Pong Joint Optimization of PAPR Reduction and HPA Linearization in OFDM Systems," IEE Transactions on Broadcasting, vol. 65, No. 2, Jun. 2019, 8 pages.

Wang, Dongming et al., "Augmented Real-Valued Time-Delay Neural Network for Compensation of Distortions and Impairments in Wireless Transmitters," IEEE Transactions on Neural Networks and Learning Systems, vol. 30, No. 1, Jan. 2019, 13 pages.

Yu, Huihui et al., "A Memory Term Reduction Approach for Digital Pre-Distortion Using the Attention Mechanism," Digital Object Identifier 10.1109/ACCESS.2019.2906370, 10 pages.

Sonal, Manish, "Machine Learning for PAPR Distortion Reduction in OFDM Systems," Degree Project in Electrical Engineering, KTH Royal Institute of Technology, School of Electrical Engineering, Stockholm, Sweden, 2016, 69 pages.

Wang, Siqi et al., "A Joint Crest Factor Reduction and Digital Predistortion for Power Amplifiers Linearization Based on Clipping-and-Bank-Filtering," IEEE Transactions on Microwave Theory and Techniques, vol. 68, No. 7, Jul. 2020, 9 pages.

Wu, Yibo et al., "Residual Neural Networks for Digital Predistortion," arXiv:2005.05655v1, May 12, 2020, 6 pages.

Sun, Jinlong et al., "Adaptive Deep Learning Aided Digital Predistorter Considering Dynamic Envelope," IEEE Transactions on Vehicular Technology, vol. 69, No. 4, Apr. 2020, 5 pages.

Younes, M. et al., "Linearization of Concurrent Tri-Band Transmitters Using 3-D Phase-Aligned Pruned Volterra Model," IEEE Transactions on Microwave Theory and Techniques, Dec. 2013, vol. 61, No. 12, 10 pages.

* cited by examiner

METHOD AND DEVICE(S) FOR SUPPORTING MACHINE LEARNING BASED CREST FACTOR REDUCTION AND DIGITAL PREDISTORTION

CROSS REFERENCE TO RELATED APPLICATIONS

This application is a 35 U.S.C. § 371 national stage application of PCT International Application No. PCT/SE2021/050147 filed on Feb. 22, 2021, the disclosure and content of which is incorporated by reference herein in its entirety.

TECHNICAL FIELD

Embodiments herein concern a method and devices(s) for supporting machine learning (ML) based crest factor reduction (CFR) and/or digital predistortion (DPD) on multiple digital input signals relating to different frequency bands, respectively, in order to condition said signals before power amplification and subsequent transmission in said frequency bands by a wireless communication network.

BACKGROUND

Communication devices such as wireless communication devices, that simply may be named wireless devices, may also be known as e.g. user equipments (UEs), mobile terminals, wireless terminals and/or mobile stations. A wireless device is enabled to communicate wirelessly in a wireless communication network, wireless communication system, or radio communication system, e.g. a telecommunication network, sometimes also referred to as a cellular radio system, cellular network or cellular communication system. The communication may be performed e.g. between two wireless devices, between a wireless device and a regular telephone and/or between a wireless device and a server via a Radio Access Network (RAN) and possibly one or more core networks, comprised within the cellular communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type of Communication (MTC) devices, i.e. devices that are not associated with a conventional user.

The wireless device may be, for example, portable, pocket-storable, hand-held, computer-comprised, or vehicle-mounted mobile device, enabled to communicate voice and/or data, via the RAN, with another entity, such as another wireless device or a server.

The wireless communication network may cover a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", "gNB", or BTS (Base Transceiver Station), depending on the technology and terminology used. The base stations may be of different classes such as e.g. macro eNodeB, home eNodeB or pico base station, based on transmission power and thereby also cell size. A cell is typically identified by one or more cell identities. The base station at a base station site may provide radio coverage for one or more cells. A cell is thus typically associated with a geographical area where radio coverage for that cell is provided by the base station at the base station site. Cells may overlap so that several cells cover the same geographical area. By the base station providing or serving a cell is typically meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Spécial Mobile), which may be referred to as 2nd generation or 2G.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The expression downlink (DL) may be used for the transmission path from the base station to the wireless device. The expression uplink (UL) may be used for the transmission path in the opposite direction i.e. from the wireless device to the base station.

In 3rd Generation Partnership Project (3GPP) Long Term Evolution (LTE), base stations, which may be referred to as eNodeBs or eNBs, may be directly connected to other base stations and may be directly connected to one or more core networks. LTE may be referred to as 4th generation or 4G.

The 3GPP has undertaken to evolve further the UTRAN and GSM based radio access network technologies, for example into evolved UTRAN (E-UTRAN) used in LTE.

Work is ongoing with developing a next generation wide area networks, which may be referred to as NeXt generation (NX), New Radio (NR), or fifth generation (5G).

Wideband radio systems that can cover 1 GHz instantaneous bandwidth (IBW) or above has been an active area of research from both academia and industry in recent years. Linearization of the power amplifier (PA) is one of the major challenges in designing wideband radio systems since PA is inherently nonlinear when operating at higher efficiency. The PA is used by e.g. a base station to amplify signals to be transmitted in a wireless communication network. The non-linear behaviour of the PA introduces spectral regrowth and typically violates many requirements, e.g. defined by 3GPP. Digital pre-distortion (DPD), which can be considered to work like the inverse of the PA, has been proven a cost-effective solution to linearize PA. The combination of DPD and PA should desirably provide linear output so that e.g. 3GPP requirements can be met. On the other hand, orthogonal frequency division modulation (OFDM) has inherent drawbacks of a very high peak to average power ratio (PAPR), hence it typically requires a high dynamic range of PA which is costly. Crest factor reduction (CFR) which is also known as peak power reduction is a technique to reduce the dynamic range of the signal resulting in a cost-efficient solution for PA design.

In a wideband transmitter, a PA normally have to handle multiple input signals simultaneously which are often spread over multiple non-contiguous bands.

FIGS. 1A-B show an example of non-contiguous multiband signals for a wideband system with e.g. IBW>1 GHz. As can be seen there are 3 non-contiguous frequency bands, one that is being magnified. As illustrated in the figures, e.g. by comparing FIG. 1A with 1B, signals get distorted when passing through the PA, which alternatively may be referred to as High Power Amplifier (HPA) in circumstances relevant herein. The goal of the DPD is to linearize output signals and satisfy 3GPP requirements. The complexity of DPD increases exponentially with the number of input signals typically corresponding to the number of non-contiguous bands. As a result, DPD for multiband, i.e. more than two bands, systems with non-contiguous bands is a challenging problem to solve. Most of the existing DPD methods assume that PA behaviour can be modelled as a Volterra series. DPD which works like the inverse of the PA can be represented as variants of the Volterra series such as generalized memory polynomial, memory polynomial. Once the model has been selected, DPD design mainly focuses on identifying the order of the polynomial, memory taps and their corresponding coefficients. As the number of input signals increases, DPD requires complicated models to linearize PA and often requires higher order polynomial with more memory taps.

FIG. 2 is a schematic block diagram for illustrating an example of a conventional DPD architecture, e.g. for application to single band or multiband signals based on the prior art. Multiband digital baseband data, corresponding to multiband input signals, from previous radio modules are input to a digital upconverter 1. The output of the digital upconverter 1 is then input to a DPD unit 3 comprising a DPD actuator 5 and a DPD adaptor 7. The output of the DPD unit 3 and the DPD performed by the DPD actuator 5, are DPD output signals that correspond to predistorted versions of the input signals, respectively. The output of the DPD unit 3, i.e. the predistorted signals, are input to a radio front end 30 that comprises a radio frequency digital to analogue converter (RF DAC) 31. The resulting analogue signal is then power amplified by a PA 33 and transmitted by an antenna. There is also a radio transit observation receiver (TOR) 40 that receives the power amplified signal and converts it back to the digital domain to be used for feedback to the DPD adaptor 7 so it can adapt DPD coefficients based on it and provide the DPD coefficients to the DPD actuator 5. The radio TOR 40 comprises a RF analogue to digital converter (RF ADC) 41 and a signal conditioning module 43.

On the other hand, multiple input signals spread over multiple non-contiguous bands increase PAPR. As a result, designing CFR for the wideband multiband system is also a challenging task. Traditional wideband CFR such as multiband turbo clipping and peak cancellation is designed to make a trade-off between complexity and performance. For instance, multiband turbo clipping is designed to handle the worst-case scenario which assumes that all the input signals will be added constructively before sending them to the PA. There are several variants of multiband turbo clipping which relax the worst-case assumption to improve the performance at a cost of higher complexity.

An example of a prior art DPD technique can be found in M. Younes, A. Kwan, M. Rawat and F. M. Ghannouchi, "Linearization of Concurrent Tri-Band Transmitters Using 3-D Phase-Aligned Pruned Volterra Model" in IEEE Transactions on Microwave Theory and Techniques, vol. 61, no. 12, pp. 4569-4578, December 2013, doi:10.1109/TMTT.2013.2287176.

Example of and details regarding CFR solutions are e.g. disclosed in WO2013014551 A1 and WO2019231381 A1.

SUMMARY

In view of the above, an object is to enable or provide one or more improvements or alternatives in relation to the prior art, such as provide improvements regarding CFR and DPD on multiple digital input signals relating to different frequency bands, respectively, in order to condition said signals before power amplification and subsequent transmission in said frequency bands by a wireless communication network.

According to a first aspect of embodiments herein, the object is achieved by a method, performed by one or more devices, for supporting performance of machine learning (ML) based CFR and/or DPD on multiple digital input signals relating to different frequency bands, respectively, in order to signal condition said signals before power amplification and subsequent transmission in said frequency bands by a wireless communication network. Said device(s) obtains said multiple digital input signals as complex valued signals. The device(s) then performs feature construction that takes said multiple digital input signals as input and provides constructed feature signals according to predefined constructed feature types as output. The predefined constructed feature types relate to at least the following per complex valued sample of the obtained complex valued multiple digital input signals: the real part of the sample, the imaginary part of the sample and at least one of the absolute value of the sample and the phase of the sample.

According to a second aspect of embodiments herein, the object is achieved by a computer program comprising instructions that when executed by one or more processors causes said one or more devices to perform the method according to the first aspect.

According to a third aspect of embodiments herein, the object is achieved by a carrier comprising the computer program according to the second aspect.

According to a fourth aspect of embodiments herein, the object is achieved by one or more devices for supporting performance of machine learning based CFR and/or DPD on multiple digital input signals relating to different frequency bands, respectively, in order to signal condition said signals before power amplification and subsequent transmission in said frequency bands by a wireless communication network. Said device(s) are configured to obtain said multiple digital input signals as complex valued signals. The device(s) are also configured to perform feature construction that takes said multiple digital input signals as input and provides constructed feature signals according to predefined constructed feature types as output. The predefined constructed feature types relate to at least the following per complex valued sample of the obtained complex valued multiple digital input signals: the real part of the sample, the imaginary part of the sample and at least one of the absolute value of the sample and the phase of the sample.

The feature construction facilitates ML based CFR and/or DPD when the IBW is wideband, even in the magnitude of GHz, and with non-contiguous bands, i.e. when said frequency bands are non-contiguous. There may be one or several carriers within each band. Experiments and measurements on ML based CFR and/or DPD based on embodiments herein have shown that it is possible with results comparable to prior art CFR and/or DPD methods for single band or multiple contiguous bands input signals. Embodiments herein also enable general advantages associated with ML solutions. These advantages are improving over time and with the advent of new machine learning HW accelerators, e.g. resulting in new generation HW chips adapted for implementation of ML solutions at both better performance and lower cost than previously possible. Embodiments herein enable to take advantage of this.

BRIEF DESCRIPTION OF THE DRAWINGS

Examples of embodiments herein are described in more detail with reference to the appended schematic drawings, which are briefly described in the following.

DETAILED DESCRIPTION

Figure 1A:
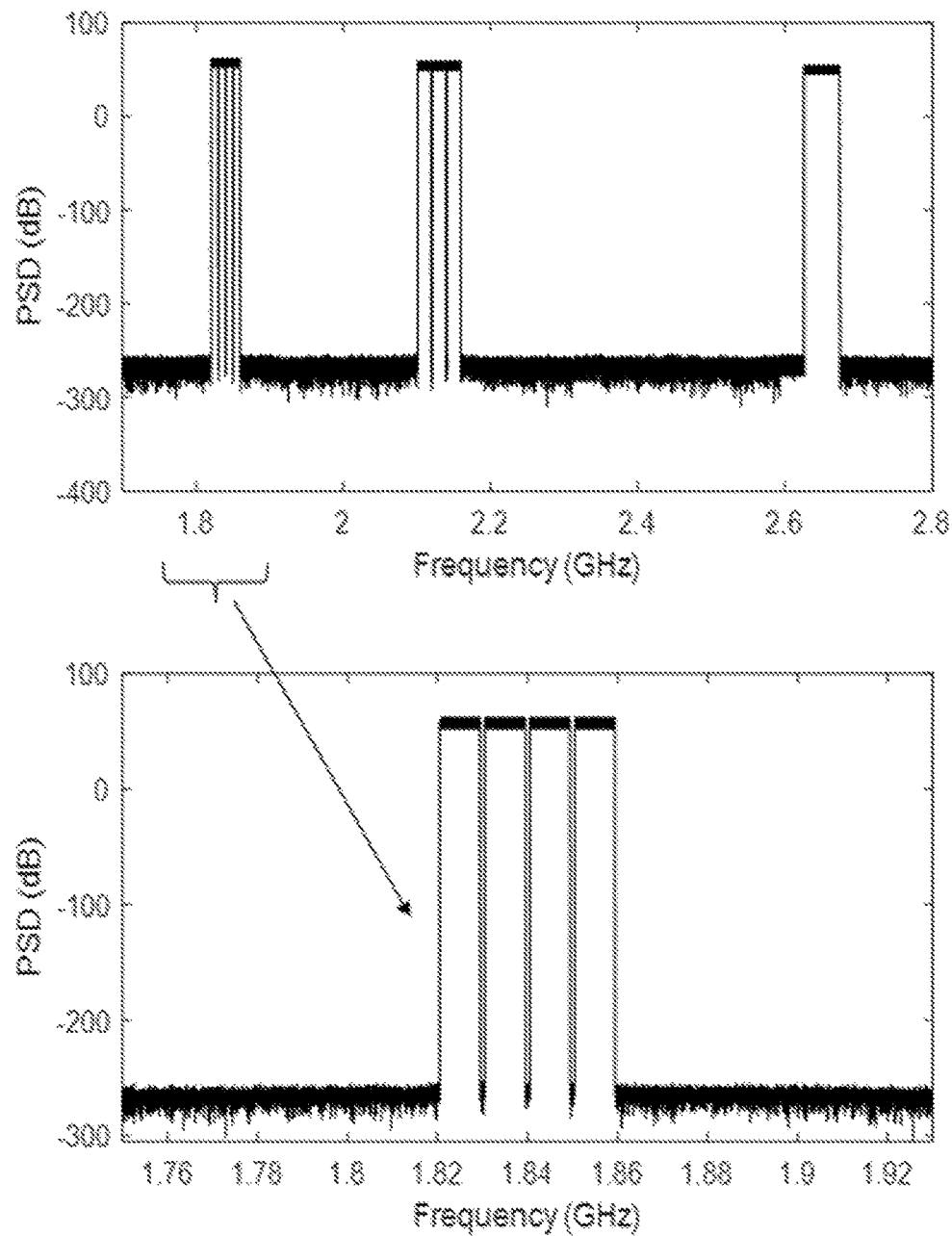
FIGS. 1A-B show an example of non-contiguous multi-band signals for a wideband system.

Throughout the following description similar reference numerals may be used to denote similar elements, units, modules, circuits, nodes, parts, items or features, when applicable. Features that appear only in some embodiments are, when embodiments are illustrated in a figure, typically indicated by dashed lines.

Embodiments herein are illustrated by exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

As part of the development of embodiments herein, the situation indicated in the Background will first be further elaborated upon.

As used herein, instantaneous bandwidth, or IBW, can be considered the frequency range from lowest to highest frequency of the signals subject to the power amplification, i.e. of the signals that instantaneously are to be power amplified, typically corresponding to a total bandwidth that the power amplifier is to be used with. The instantaneous bandwidth, in terms of predefined frequency bands (e.g. as specified by 3GPP) that a PA shall be able to handle instantaneously, corresponds to a frequency range stretching from the lowest frequency of the lowest such frequency band to the highest frequency of the highest such frequency band.

Since the signals within the IBW and that are to be power amplified typically are spaced apart and belongs to spaced-apart frequency bands, i.e. non-contiguous frequency bands, and these signals and frequency bands are not continuously filling up the IBW, there is typically a lot of space within the IBW without signals to be power amplified. In these spaces it is desirable, or even required, that the power amplification results in no, or very small, amounts of noise or spurious signals, e.g. due to intermodulation and non-linearities of the PA. At the same time, there being spaces can be utilized since the effective bandwidth with signals is smaller than the IBW. A conventional design that would attempt to handle a whole IBW "as is" for a wideband system, e.g. with IBW>1 GHz, would not be efficient or practically feasible. Still, the IBWs desirable to handle are increasing with increased number of new and different wireless communication systems being employed, and further and additional higher frequencies and frequency bands that these systems rely on are being used. In other words, it is in general desirable to find new ways of handling PA with large IBWs and that enable more efficient implementations than conventionally.

As already indicted in the Background, most of the existing DPD solutions assume that PA behavior can be represented as variants of the Volterra series, hence limiting design accuracy. Recent advancement of neural network and its variants such as deep neural network, convolutional neural network, recurrent neural network have shown better accuracy to model nonlinear behavior in general. Therefore, machine learning (ML) based DPD solutions has received great attention from academia, see e.g. D. Wang, M. Aziz, M. Helaoui, and F. M. Ghannouchi, "*Augmented real-valued time-delay neural network for compensation of distortions and impairments in wireless transmitters*", in IEEE Transactions on Neural Networks and Learning Systems (Volume: 30, Issue: 1, January 2019). However, most of those works only focus on either the single band case or contiguous multiband case. On the other hand, looking at CFR, machine learning based CFR has received much less attention even for single band cases, see e.g. M. Sonal, "*Machine Learning for PAPR Distortion Reduction in OFDM Systems*", published as Degree Project in Electrical Engineering, second cycle, 30 credits, Stockholm, Sweden, 2016.

There are very few works that jointly consider CFR and DPD. See e.g. S. Wang, M. Roger, J. Sarrazin, and C. Lelandais-Perrault, "*A Joint Crest Factor Reduction and Digital Predistortion for Power Amplifiers Linearization Based on Clipping-and-Bank-Filtering*", in IEEE Transactions on Microwave Theory and Techniques (Volume: 68, Issue: 7, July 2020).

Although non-contiguous multiband is a very popular scenario from a mobile operator point of view, as indicted above, there is a lack of joint CFR and DPD designs solutions for such situation and that are based on machine learning (ML).

An idea underlying embodiments herein is to jointly consider DPD and CFR and to facilitate machine learnings solutions, i.e. with CFR and/or DPD based on machine learning, in particularly such that are suitable for said case with large IBW and non-contagious frequency bands, and thereby with multiple different input signals to be processed.

Embodiments herein, discussed in detail further below, e.g. relate to how multiple input signals coming from multiple non-contiguous bands can be taken into account and construct feature spaces to facilitate machine learning solutions for CFR and DPD. Below is explained signals properties can be used, how memory terms can be incorporated so that different machine learning algorithms suitable for multiband CFR and DPD can be used, e.g. based on neural network (NN) and recurrent neural network (RNN). Particularly, it is presented machine learning based multiband wideband transmitter architectures suitable to use for this and where signals may be transmitted over several non-contiguous bands. There are architectures both with separate machine learning models for CFR and DPD, and with a single machine learning model for CFR & DPD, the latter referred to as a machine learning based joint CFR & DPD architecture.

Moreover, it is below, when embodiments herein are discussed in detail, shown how feature spaces can be constructed for multiband cases and that are suitable for different types of neural networks. Mainly two multiband transmitter architectures are explained and that can handle dynamic changes of the PA behavior. Experimental results have shown that DPD and CFR based on embodiments herein can perform at least as good as existing solutions.

However, a major advantage with embodiment herein and using machine learning is that with the advent of new machine learning HW accelerators, which are rapidly gaining foothold in many electronic devices, it is likely that conventional HW architectures will replaced by increasingly improved and high performance ML based HW. Embodiments herein are suitable to with such future generation HW chips and can thereby also gain from improvements in performance and power consumption that these will enable.

Before describing embodiments herein further and in greater detail, a wireless communication network will be described for providing a context in which embodiments herein may be implemented and utilized.

Figure 3:
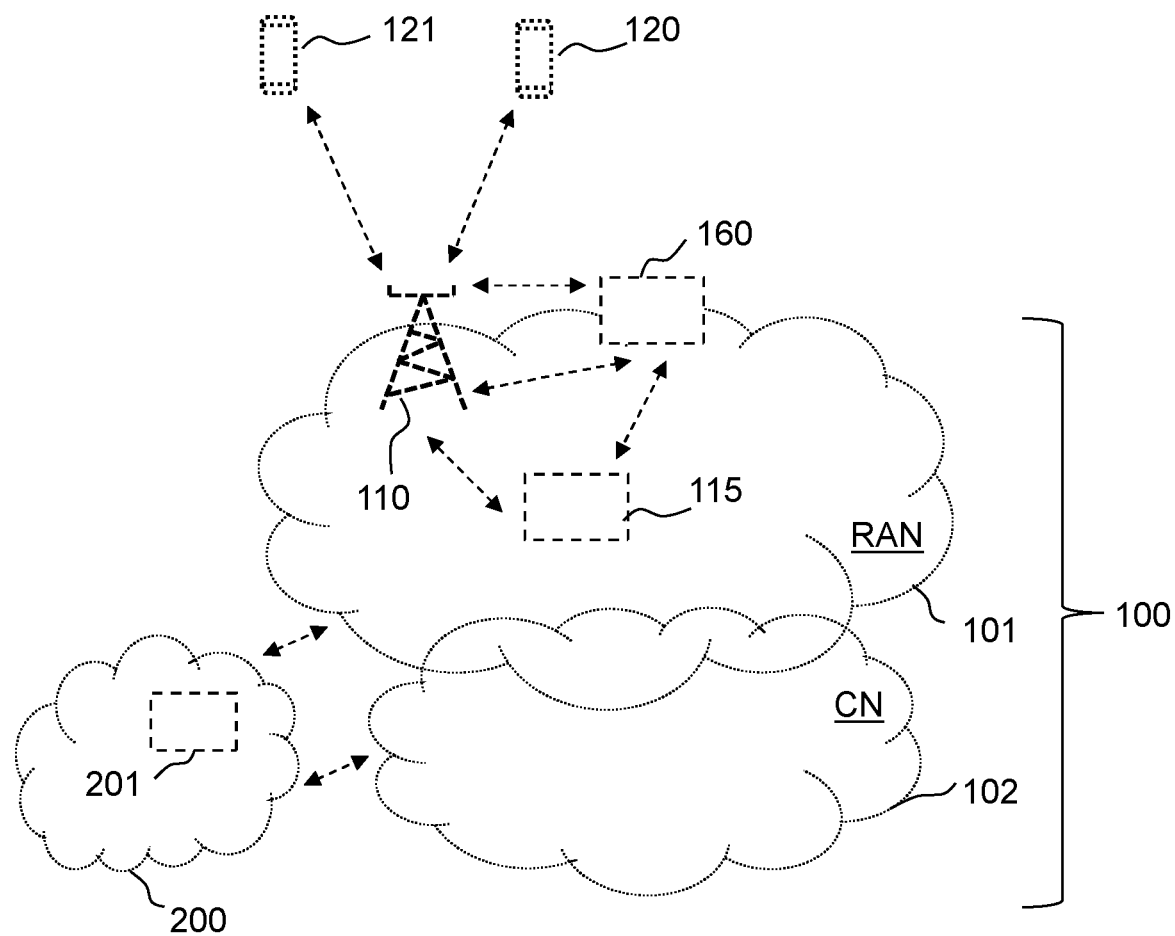
FIG. 3 is a block diagram schematically depicting a wireless communication network in which embodiments herein may be implemented and utilized.

FIG. 3 is a block diagram schematically depicting a wireless communication network 100 in which embodiments herein may be implemented and utilized.

The wireless communication network 100 may comprise a Radio Access Network (RAN) 101 part and a Core Network (CN) 102 part. The wireless communication network 100 may be a telecommunication network or system, such as a cellular communication network that supports at least one Radio Access Technology (RAT), e.g. LTE, or 4G, and/or New Radio (NR) that also may be referred to as 5G, or even further generations.

The wireless communication network 100 typically comprises network nodes that are communicatively interconnected. The network nodes may be logical and/or physical and are located in one or more physical devices. The wireless communication network 100, typically the RAN 101, comprises one or more radio network nodes, e.g. radio network node 110. The radio network nodes are or comprise radio transmitting and/or receiving network nodes, such as base stations and/or are or comprises controlling nodes that control one or more radio transmitting and/or receiving network nodes. The radio network nodes are configured to serve and/or control and/or manage one or more wireless communication devices. Each radio network node provide one or more radio coverages, e.g. corresponding to one or more radio coverage areas, i.e. radio coverage that enables communication with one or more wireless communication devices. A wireless communication device may alternatively be named a wireless device and it may correspond to a UE etc. as mentioned in the Background. Each radio coverage may be provided by and/or associated with a particular Radio Access Technology (RAT). Each radio coverage area may correspond to a so called cell or a radio beam, that simply may be named a beam. As should be recognized by the skilled person, a beam is a more dynamic and relatively narrow and directional radio coverage compared to a conventional cell, and may be accomplished by so called beamforming. A beam is typically for serving one or a few communication devices at the same time, and may be specifically set up for serving one or few communication devices. The beam may be changed dynamically by beamforming to provide desirable coverage for the one or more wireless communication devices being served by the beam. There may be more than one beam provided by one and the same radio network node.

Said radio network nodes may e.g. be communicatively connected, such as configured to communicate, over, or via, a certain communication interface and/or communication link.

Further, the wireless communication network 100, or rather the CN 102, typically comprises one or more core network nodes, that may be communicatively connected to each other and other network nodes, such as configured to communicate, over, or via, a communication interface and/ or communication link, with radio network nodes of the RAN 101, e.g. with the radio network node 110.

The figure also shows wireless communication devices 120, 121 for communication with the wireless communication network 100, e.g. by being served by the wireless communication network 100, e.g. by the radio network node 110 when within radio coverage associated with it. Radio communication between wireless communication devices and the radio network nodes of the wireless communication network take part over radio channels between each wireless communication device, e.g. 120, and the radio network node 110.

The figure also shows a further node 201 and a further network 200. The further node 201 may be located outside the wireless communication network 100, i.e. be an external node, as indicated in the figure, or alternatively (not indicated in the figure) be comprised in the wireless communication network 100 and thus be a network node thereof, e.g. a management node thereof. The further network node 201 may in principle be any node communicatively connected to the wireless communication network 100. Likewise, the further network 200 may be located outside the wireless communication network 100, i.e. be an external network, as indicated in the figure, e.g. corresponding to a so-called computer cloud, often simply referred to as cloud, that may provide and/or implement services and/or functions for and/or relating to the wireless communication network 100. The further network 200 may alternatively (not indicated in the figure) be comprised in the wireless communication network 100 and thus e.g. correspond to a subnetwork thereof. It is implied that a network 100 and the further network 200 comprises interconnected network nodes and may e.g. include the further node 201 as indicated in the figure. The further network 200 may in principle be any network communicatively connected to the wireless communication network.

Embodiments herein, and DRF and/or DPD in general, are typically performed by a radio network node, e.g. base station, such as the radio network node 110, but may alternatively e.g. be performed by another network node, e.g. a network node 111, comprised in the wireless communication network 100, connected to a radio network node and that provides data to be transmitted by the radio network node. Such radio network node 111 may be locate in the RAN 101 or, although less likely, in the CN 102.

Moreover, shown in the figure is a radio transmit observation receiver (TOR) 160 that may receive radio signals from the radio network node 110 and feedback the received signals in digital format to the network 100 and e.g. the radio network node 110. How such radio TOR may be used with embodiments herein will be discussed in further detail below.

Attention is drawn to that FIG. 3 is only schematic and for exemplifying purpose and that not everything shown in the figure may be required for all embodiments herein, as should be evident to the skilled person. Also, a wireless communication network or networks that correspond(s) to the wireless communication network 100, will typically comprise several further network nodes, such as further radio network nodes, e.g. base stations, network nodes, e.g. both radio and core network nodes, etc., as realized by the skilled person, but which are not shown herein for the sake of simplifying.

Figure 1B:
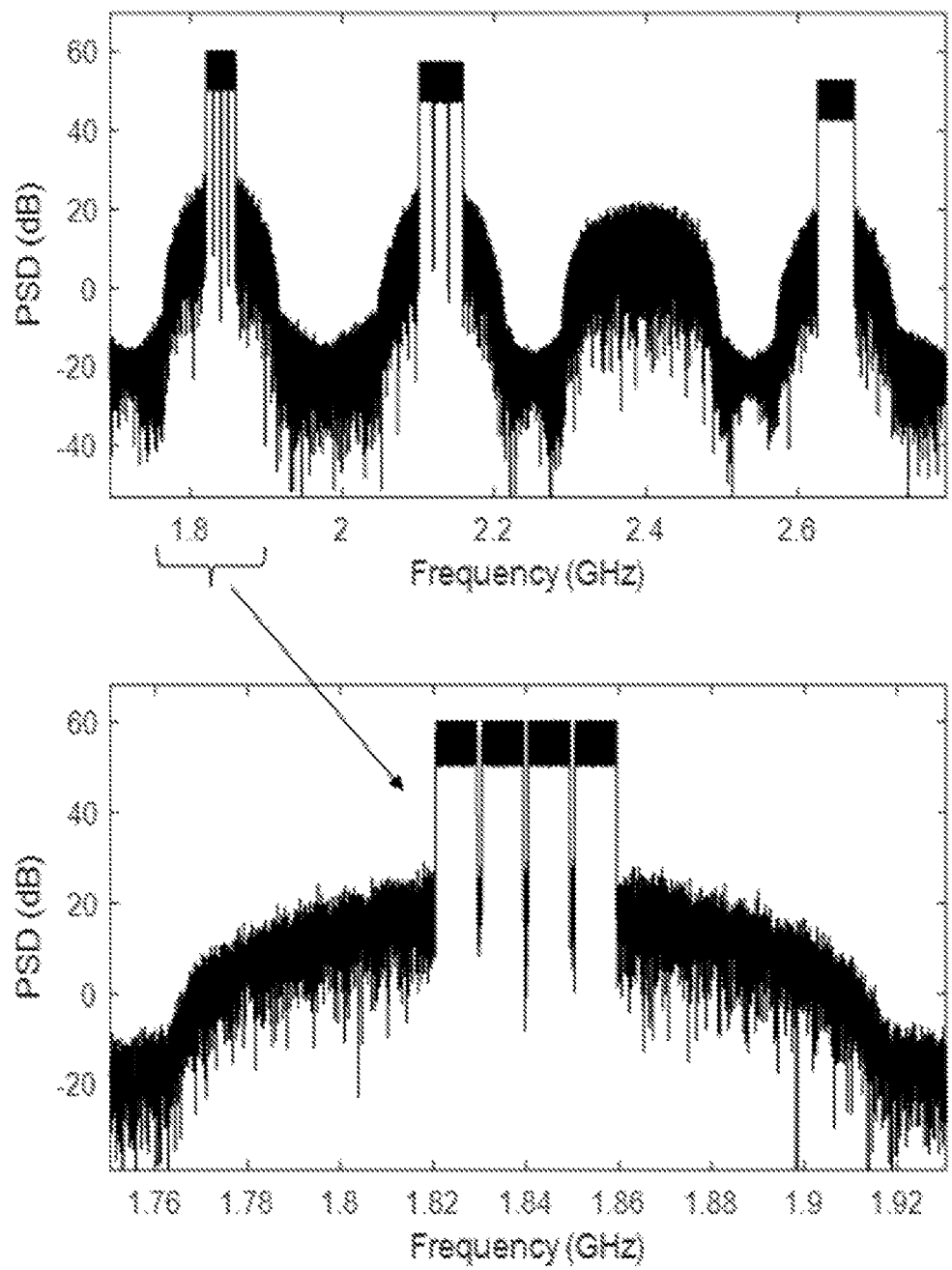

In the following, single carrier multiband cases are used in examples, i.e. with one carrier per frequency band, however, as the skilled person recognizes, embodiments herein and architectures discussed are also compatible with and can handle multicarrier multiband cases, i.e. with more than one carrier per frequency band, e.g. as shown in FIG. 1.

Figure 4:
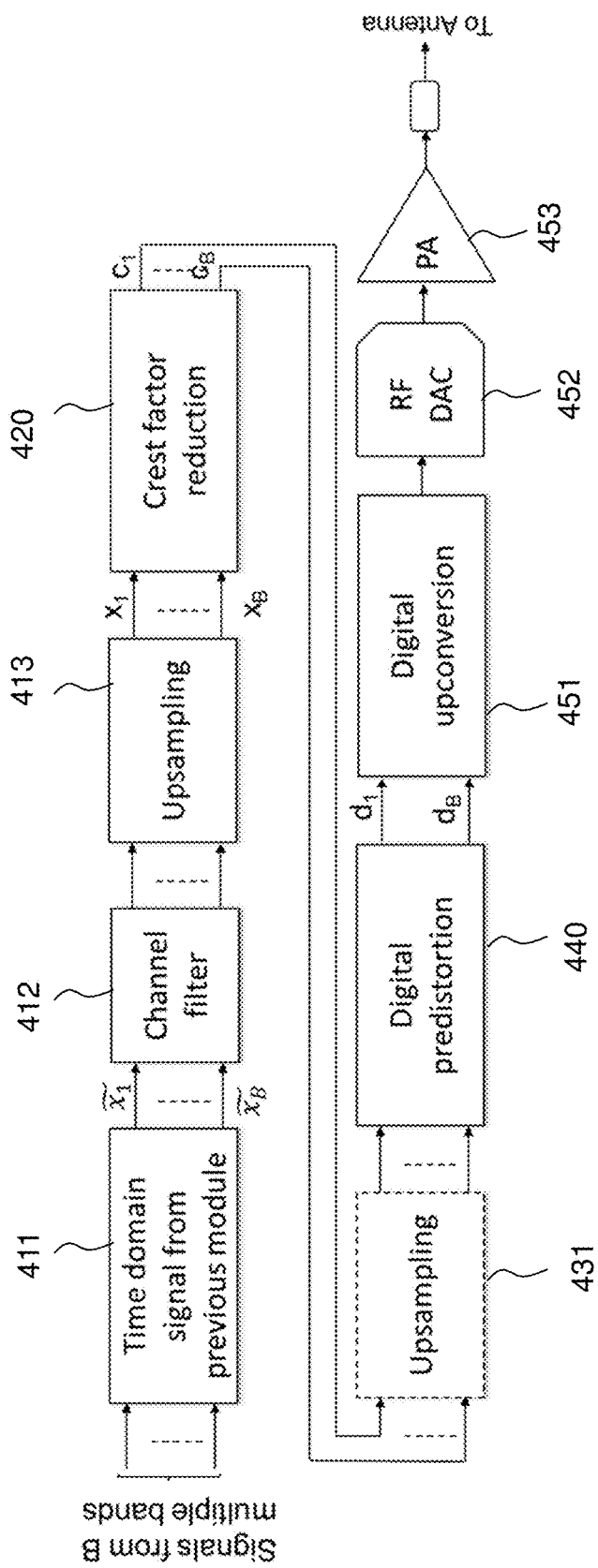
FIG. 4 schematically shows an example of a wideband transmitter architecture with CFR and DPD.

FIG. 4 schematically shows an example of a wideband transmitter architecture with CFR and DPD. The architecture is used as a reference when solutions according to embodiments herein are discussed.

It is shown a multiband transmitter that receives B different frequency bands digital input signals $\widetilde{x_1}$, $\widetilde{x_2}$, ... $\widetilde{x_B}$ from a previous radio module, represented by a schematic module 411 in the figure. Said signals $\widetilde{x_1}$, $\widetilde{x_2}$, ... $\widetilde{x_B}$ are passed through channel filter(s) 412 and upsampled by an upsampler 413 according to CFR requirements. Output from the upsampler 413 are represented by $x_1, x_2, \ldots, x_B$. Then there is CFR performed by a CFR part 420. In some embodiments, and conventionally, the CFR part 420 may and would be based on some suitable known multiband clipping algorithm for CFR. The output from the CFR part 420 are signals $c_1, c_2, \ldots, c_B$, which are input to a DPD part 440. Note that there e.g. may be upsamplig between CFR and DPD if e.g. CFR and DPD rates are different, illustrated by an upsampler 431 in the figure. In some embodiments and/or conventionally, the DPD part 440 may and would be based on some suitable one of several known DPD solutions. For example, a prior art frequency-selective DPD or with separate DPDs per frequency band can be used. In any case, the DPD part 440 generates a DPD output, i.e. signals $d_1, d_2, \ldots, d_B$ in the figure. This outputs from the DPD part 440 may then be sent for digital upconversion, in the figure illustrated by a digital upconverter 451. The output thereof is being sent to a RF DAC 452 and thereafter to a PA 453 that connects to an antenna for wireless transmission of the power amplified RF signals, e.g. as wireless transmission from a base station, e.g. 110, of a wireless communication network, e.g. the wireless communication network 100. It can be noted that there is a single PA for all B frequency bands, e.g. non-contiguous bands.

In practice, in an architecture as shown with both CFR and DPD, the CFR always is performed before DPD since CFR reduces dynamic range of the signal.

Note that in a transmitter architecture as shown there are mainly two types of signals dealt with. RF signals refer to signals that are carrier multiplied/modulated. Baseband signals, or complex baseband signals, refer to the signals that do not have any carrier information. Typically, these may be so called IQ signals or complex baseband signals, referring to time domain signals without carrier information and that are 0 Hz centered in a spectral domain.

In the embodiments to be discussed first in the following, at least the DPD part 440 is assumed to be based on machine learning, i.e. correspond to at ML DPD. The CFR part may or may not be based on ML.

Figure 5:
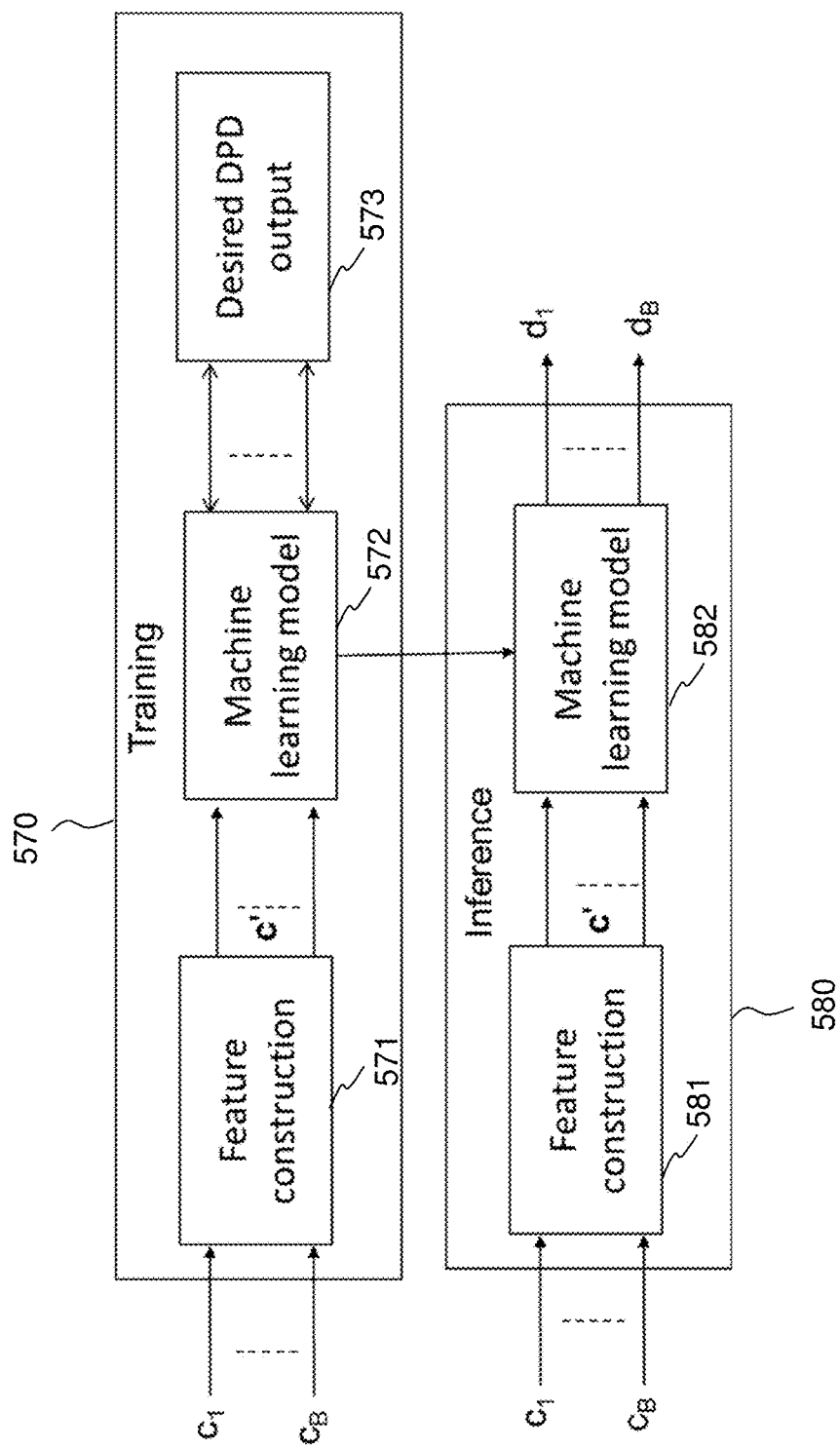
FIG. 5 schematically shows a general machine learning (ML) based DPD architecture both for training and inference.

FIG. 5 schematically shows a general machine learning based DPD architecture both for training and inference. The inference part may e.g. be used as the DPD part 440.

In a training phase, illustrated by a training block 570, three main parts are considered: a training feature construction part 571, a machine learning model part 572, and a desired DPD output part 573. During the training the ML part 572 trains a ML model, resulting in a trained ML model. An inference phase, i.e, when the trained model is used by the DPD part 440, illustrated by an inference block 580, the input is clipped output signals from all bands, i.e. corresponding to $c_1, c_2, \ldots, c_B$, and first features, or rather feature signals, are constructed according to an inference feature construction part 581. As realized, the feature construction is and shall be the same for the training and inference and may simply be referred to as feature construction in the following. Hence, the feature construction parts 571, 581 should construct the same type of features or feature signals. A machine learning part 582, using the trained ML model, then operates on the constructed features from the inference feature construction parts 581 and generates DPD output signals corresponding to $d_1, d_2, \ldots, d_B$. Note that in the figure, the same denotation $c_1, c_2, \ldots, c_B$ is used for the input to both training and inference. This is to accentuate that the signals shall be of the same type and origin, such as processed correspondingly by previous modules, e.g. as illustrated in FIG. 4, and e.g. correspond to signals after CFR. However, the actual samples are of course not the same since the training phase is separately performed and performed before the inference phase.

Figure 6:
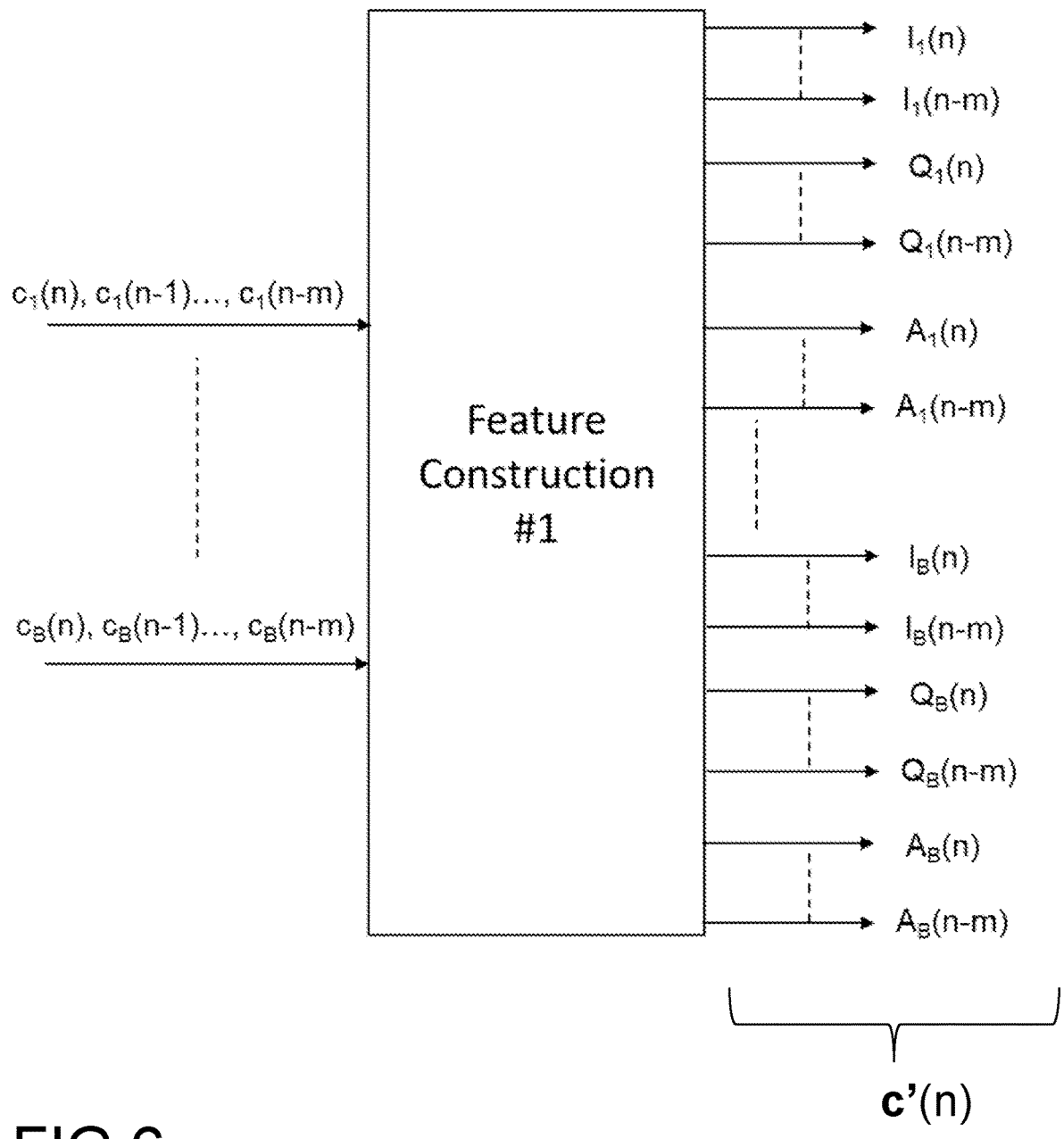
FIG. 6 schematically illustrates how features are constructed according to some embodiments with a feature construction #1.

FIG. 6 schematically illustrates how features are constructed according to some embodiments corresponding to a first feature construction, or feature construction #1. The input here is the output signals from CFR, e.g. from the CFR part 420, i.e. $c_1, c_2, \ldots, c_B$.

These signals are digital signals in the baseband and complex valued. Since they are after CFR they may be referred to as clipped and e.g. complex valued, or simply complex, clipped baseband signals. In general, signals that are input to feature construction herein may be referred to as complex digital baseband signals.

More particularly the figure shows constructed feature signals for each sample n of signals $c_1, c_2, \ldots, c_B$, where also preceding m samples, i.e. memory terms, of $c_1, c_2, \ldots, c_B$ are considered for each sample n. In other words, the feature construction here also takes m-th memory terms, or delay terms, into account. Hence, $c_1(n), c_2(n), \ldots, c_B(n)$ are complex baseband signals for n-th time index and $c_1(n-m), c_2(n-m), \ldots, c_B(n-m)$ refer to complex baseband signals at time index n-m.

As illustrated, the feature construction #1 generates real, imaginary and absolute values of signals. The real and imaginary values correspond to the value of the real and imaginary parts, respectively, of the complex valued input signal, i.e. here $c_1, c_2, \ldots, c_B$. For example, $I_1(n)=\text{Real}(c_1(n))$, $Q_1(n)=\text{Imaginary}(c_1(n))$, and $A_1(n)=\text{Absolute}(c_1(n))$. The absolute value corresponds square root of $I^2+Q^2$.

The output of this feature construction block may thus be considered a pair of the number of samples and feature vectors.

For a number B of signals c, corresponding to the number of different frequency bands, e.g. non-contiguous bands within the IBW, there is thus for each sample n of the signals $c_1(n), c_2(n), \ldots, c_B(n)$, e.g. for $c_1(n)$, constructed feature signals $I_1$ for a n:th sample and its m preceding samples, i.e. total m+1 of $I_1$ features, and correspondingly for $Q_1$ and $A_1$. Thus in total (m+1)×3 constructed feature signal samples for each sample n of one input signal to the feature construction, and thus B*(m+1)*3 constructed feature signal samples when samples for all B feature construction input signals $c_1(n), c_2(n), \ldots, c_B(n)$ are considered.

As indicated in the figure, the constructed feature signals may be arranged in one or more vectors, e.g. per or grouped per feature construction input signal, and (sub)grouped per constructed feature signal type, e.g. so that all imaginary parts $I_1$ for a n:th sample and preceding samples n-1 . . . n-m of the signal $c_1(n)$ are grouped together etc.

In some embodiments, as an alternative to the absolute values A, or in addition to them, there is also constructed feature signals for the phase, or phase value, P, of the complex valued samples, where e.g. $P_1(n)=\text{Phase}(c_1(n))$. The phase may in the context of complex numbers also be referred to as the argument.

As indicated in the figure, the resulting constructed feature signals for the n:th samples of c, i.e. $c_1(n), c_2(n), \ldots, c_B(n)$, may herein collectively be referred to as c'(n).

Figure 7A:
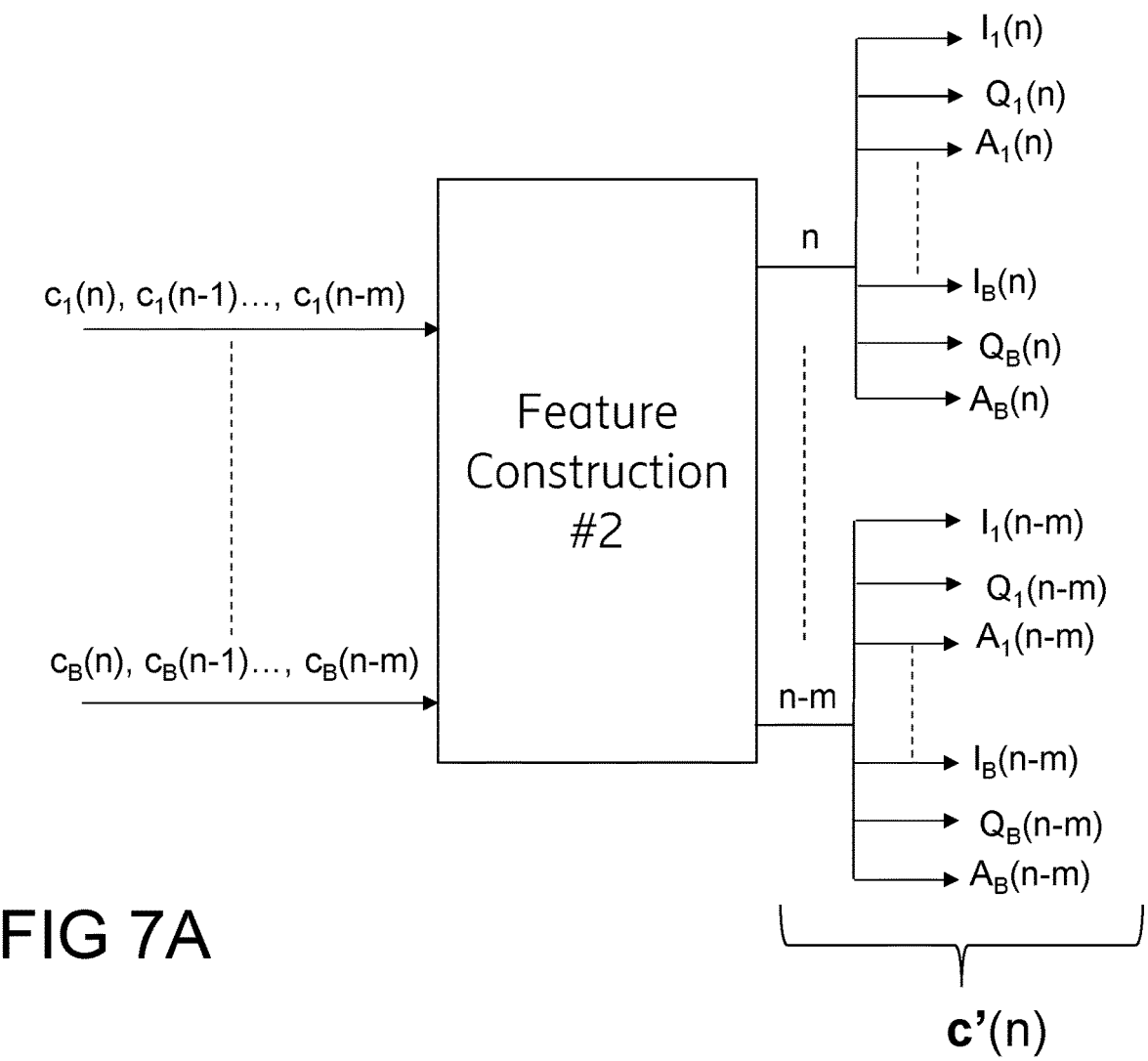
FIGS. 7A-B schematically illustrate how features are constructed according to other embodiments with a feature construction #2.

FIG. 7A schematically illustrates how features are constructed according to other embodiments corresponding to a second first feature construction, or feature construction #2. This corresponds to another option for feature construction. The general principle is the same but the output is differently arranged, The output here may instead correspond to a tuple of the number of samples and 2D matrix of the features where e.g. rows present memory terms and columns consider real, imaginary and envelope of the signals for all the bands B.

Figure 7B:
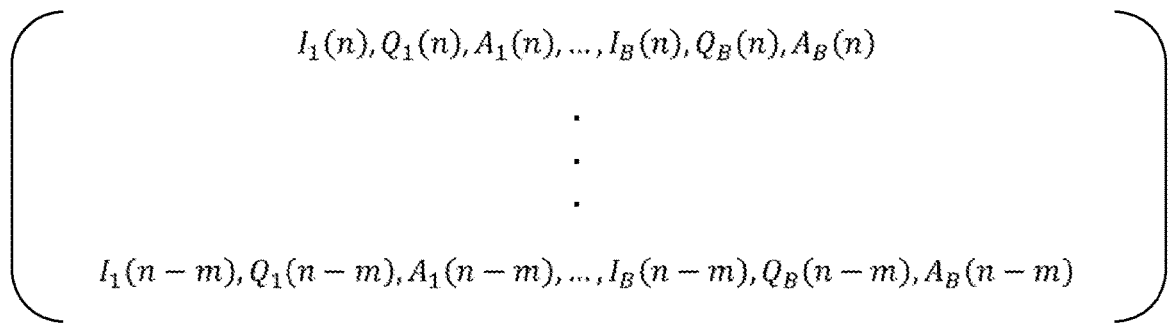

FIG. 7B gives a more detailed example of how the constructed feature signals may be arranged for these embodiments.

As indicated in the figure, also here the resulting constructed feature signals for the n:th samples of c, i.e. $c_1(n), c_2(n), \ldots, c_B(n)$, is collectively referred to as c'(n). Similarly as above, in some embodiments, as an alternative to the absolute values A, or in addition to them, there are also constructed feature signals for the phase., or phase value, P, of the complex valued samples.

FIGS. 7A-B thus show how the feature construction parts 571, 581 may operate according to embodiments herein. Regarding the machine learning model, the exact model is not important for embodiments herein. Several exists and are compatible, as recognized by the skilled person, which has also been confirmed in experiments. Any one of several conventional machine learning models can thus be used with embodiments herein. For example, any one of a neural network model, decision tree (e.g. random forest) model, and convolutional neural network model can be used.

Figure 8:
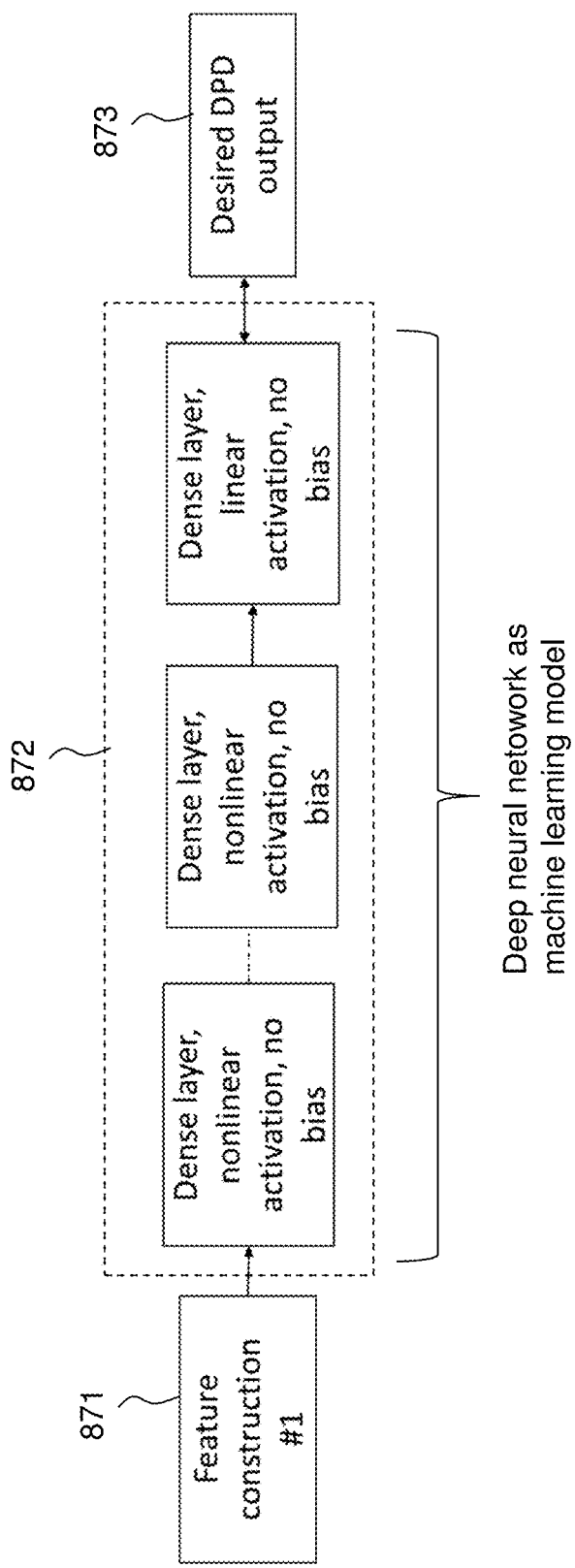
FIG. 8 schematically shows how a deep neutral network model may be used with the feature construction #1.

FIG. 8 schematically and rather self-explanatory for the skilled person shows how a deep neutral network model may be used with the feature construction #1 discussed above. As realized from comparison with the general training block 570 in FIG. 5, FIG. 8 illustrates training of the deep neural network model with feature construction based on the feature construction #1. That is, there is a feature construction part 871 based on the feature construction #1, a machine learning model part 872 corresponding to said deep neural network model and a desired DPD output part 873 used for the training.

Figure 9:
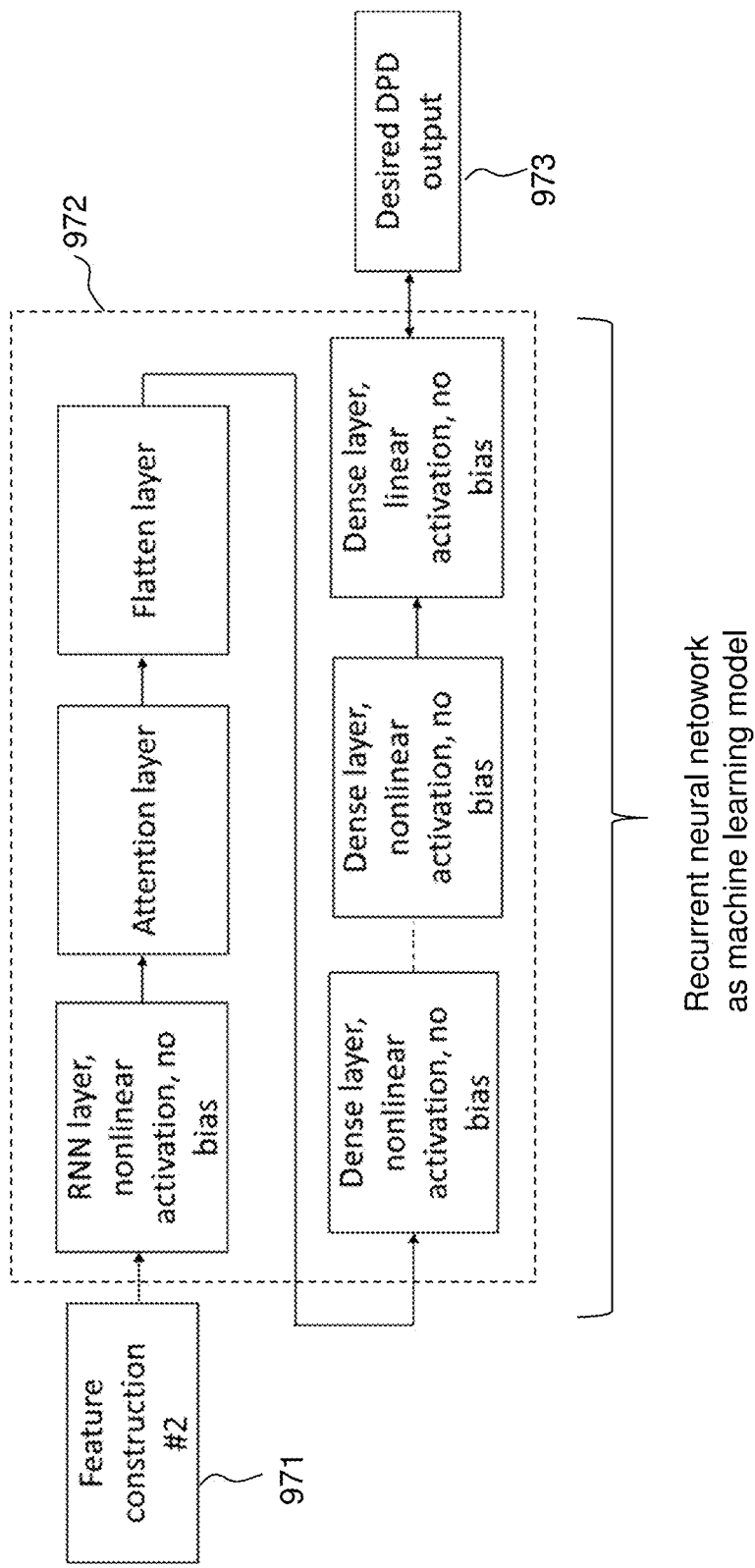
FIG. 9 schematically exemplifies how a variant of a recurrent neural network (RNN) model, together with multiple fully connected layers, may be used with the feature construction #2.

FIG. 9 schematically and rather self-explanatory for the skilled person exemplifies how a variant of a recurrent neural network (RNN) model, together with multiple fully connected layers, may be used with the feature construction #2. This may also be compared with the general training block 570 in FIG. 5. That is, there is a feature construction part 971 based on the feature construction #2, a machine learning model part 972 corresponding to said RNN model and a desired DPD output part 973 used for the training.

One may e.g. advantageously use decision tree-based machine learning algorithms such as random forest, gradient boosting and other variants, with the feature option #1. On the other hand, feature option #2 may advantageously be used with variants of convolutional neural network algorithms. A wide variety of machine learning algorithms can be used with embodiments herein.

The machine learning used with embodiments herein may use a single model to generate DPD outputs for all bands or separate machine learning models for each band.

Figure 10:
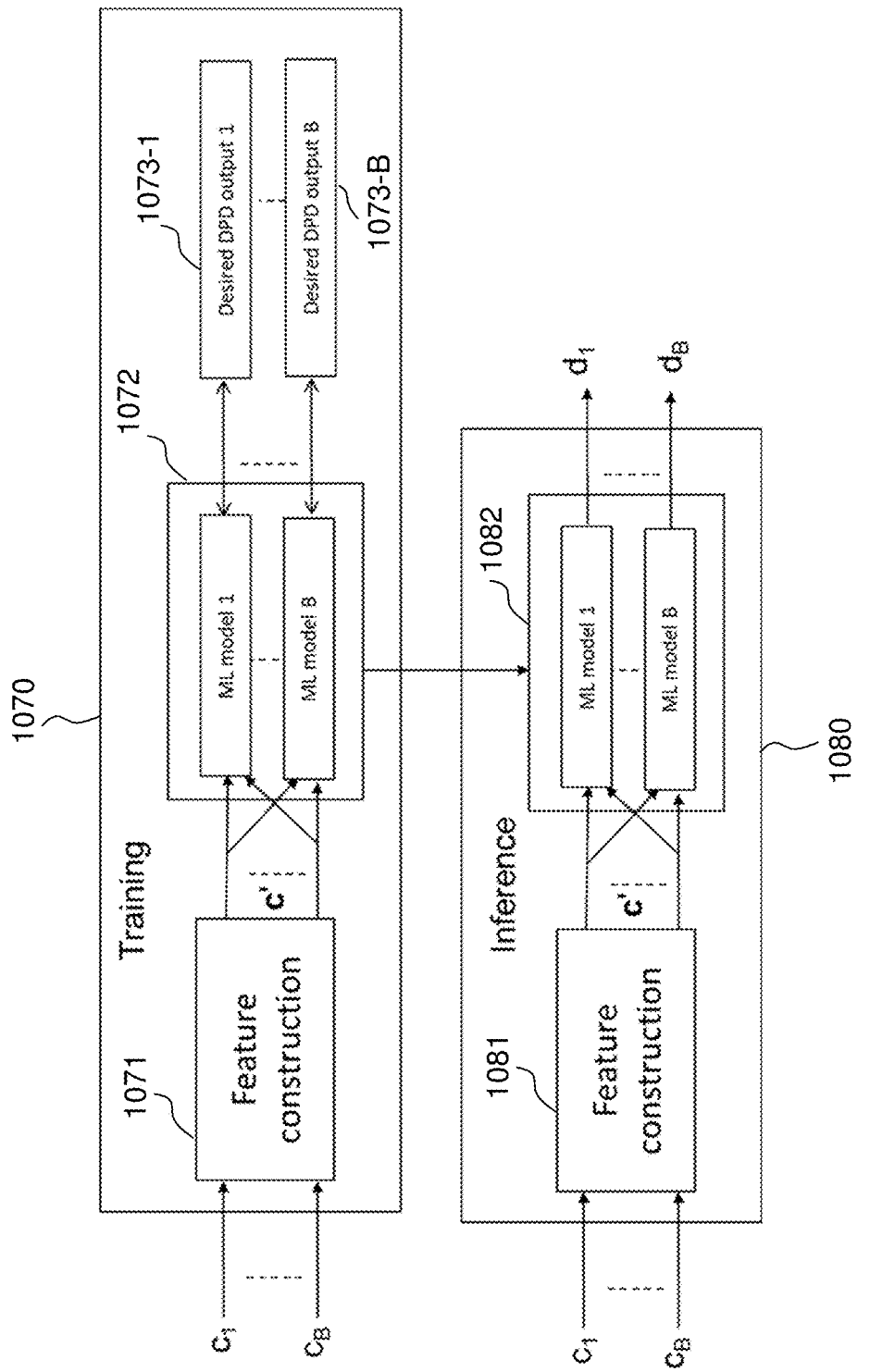
FIG. 10 schematically illustrates a situation with separate machine learning models for each band.

FIG. 10 schematically illustrates the latter, i.e. a situation with separate machine learning models for each band. Note that these typically are of the same type even if separate, e.g. a separate deep neural network model for each band or a separate RNN model for each band. The training must of course reflect this as well as also shown in the figure. One can use additional layers or remove different layers when constructing the machine learning model for the separate model per band case. For instance, one can remove the "Attention layer" in the example of FIG. 9. Note that, as indicted in the figure, each separate model still have input signals for all band B, i.e. constructed feature signals c' for all bands B.

What is shown in the figure may be compared with the similar FIG. 5 and the parts work correspondingly. There is also here a training block 1070 with a training feature construction part 1071, a machine learning model part 1072. The desired DPD output is here, however, per band, with desired DPD output parts 1073-1 ... B. During training the ML model per band is trained by the ML part 1072, resulting in trained ML models, one per band. During inference an inference block 1080 takes clipped feature construction input signals, e.g. corresponding to $c_1, c_2, \ldots, c_B$, and generates features according to an inference feature construction part 1081. As mentioned above, feature construction is and shall be the same for the training and inference and may be the same as in the case with single ML model for all bands. A machine learning part 1082 with the trained separate ML models then operates on the constructed features from the inference feature construction part 1081 and generates DPD output signals corresponding to $d_1, d_2, \ldots, d_B$.

How the desired DPD output for the training can be accomplished will now be discussed, i.e. as in the above DPD output parts 573, 873, 973, 1073-1 ... B.

For machine learning, labelled outputs are typically required or that it is generated reference outputs, so that the machine learning model being used can have desired outputs for new samples, i.e. output for new samples can be predicted during the training. Fortunately, for DPD one can advantageously use iterative learning control (ILC) to generate reference DPD outputs, i.e. desired DPD outputs to be used for the training. ILC provides an upper bound performance to linearize DPD. However, ILC is not possible to implement in a practical scenario for inference, but works for training, i.e. ILC can be used to generate reference outputs for training of machine learning models.

Iterative learning control (ILC) is a well-established technique in control theory. The principle in the present context may be described as that each sample is passed through the PA and observed PA output. The same sample is then modified and sent to the PA again. After several modifications, desired input samples are generated that provide linear PA outputs. Since this technique requires sending the same samples several times through the PA, it is not possible to deploy ILC in real-time applications. However, ILC can provide optimal DPD outputs and is used in conventional DPDs for parameter estimations. The idea here is to use it for ML DPD training instead.

Figure 2:
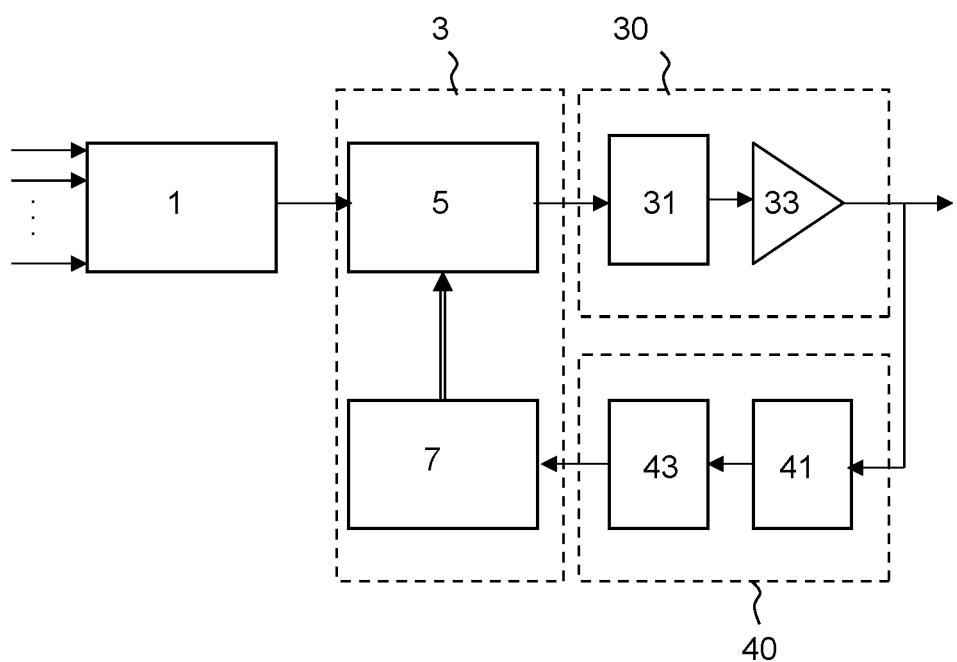
FIG. 2 is a schematic block diagram for illustrating an example of a conventional DPD architecture.
Figure 11:
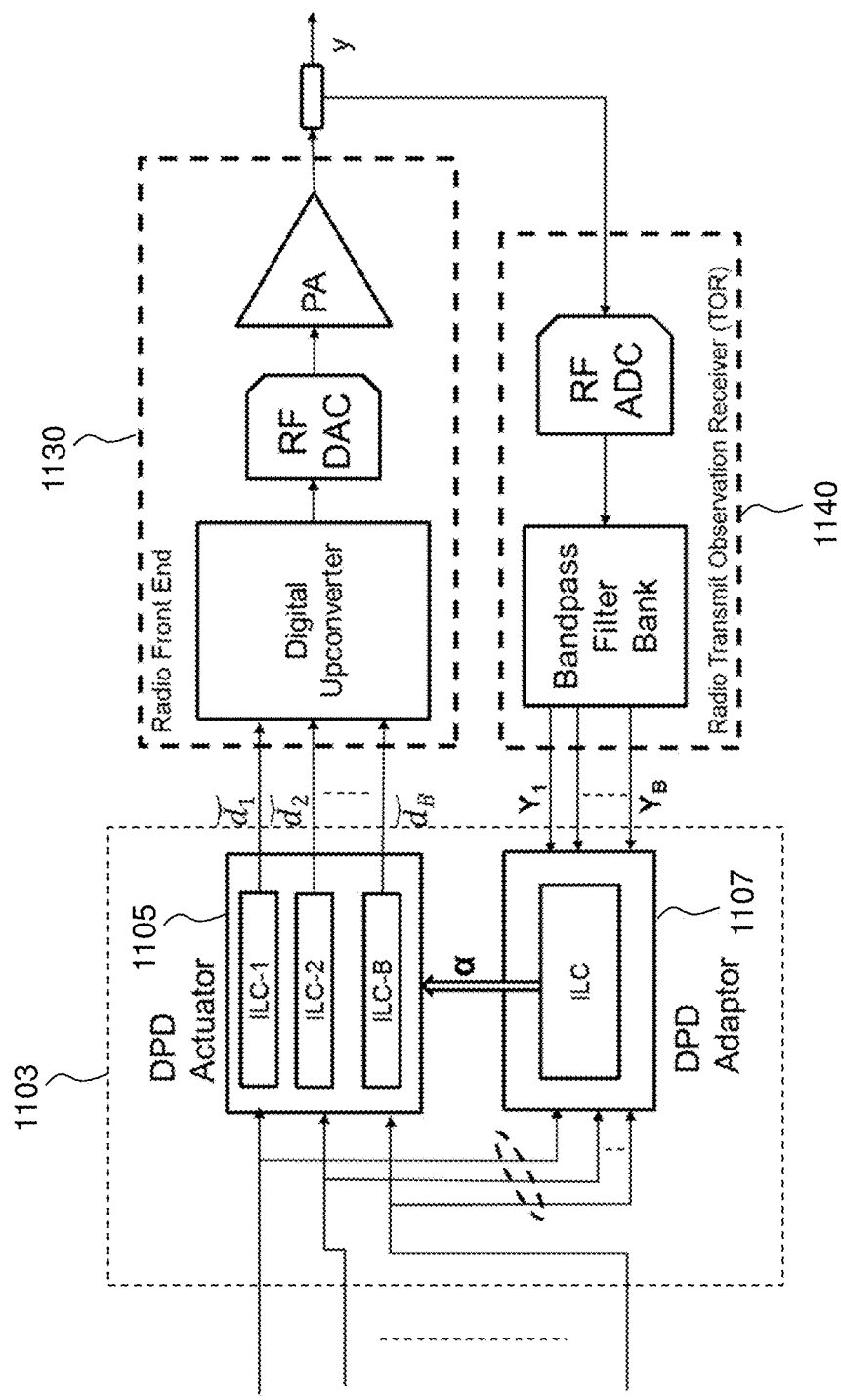
FIG. 11 schematically shows a block diagram based on iterative earning control (ILC) to form desired DPD output signals for ML training.

FIG. 11 schematically shows a block diagram based on ILC to form desired DPD output signals for ML training, where each band has its own ILC. What is shown may be compared to FIG. 2, where the blocks have similar functionality, here however only with the purpose of generating desired, or reference, DPD output to be used in training of the ML model, and with ILC based DPD for this purpose. Hence, there is here a DPD unit 1103 comprising a DPD actuator 1105 and a DPD adaptor 1107, both based on ILC. Please note that both the DPD actuator 1105 and DPD adaptor 1107 takes complex baseband signals as input, $c_1, c_2, \ldots, c_B$, e.g. from CFR. PA output Y is passed through filter banks and $Y_1, Y_2, \ldots, Y_B$ thus represents PA outputs corresponding to B bands up to linearization bandwidth. The output of the DPD unit 1103, i.e. here ILC output signals $\tilde{d}_1, \tilde{d}_2, \ldots, \tilde{d}_B$ are input to a radio front end 1130 with digital upconverter, RF DAC and PA, e.g. as in FIG. 2, and that should correspond to such radio front end, at least such PA, to be used during the inference after the training, i.e. when the trained DPD ML model is used. The resulting analogue signal in the radio front end 130 is power amplified by the PA for transmission by an antenna, although not needed to be any conventional wireless transmission in this case. There is a TOR 1140 with bandpass filters as indicated above, that provides $Y_1, Y_2, \ldots Y_B$, to the DPD unit 1103, more particularly the DPD actuator 1105 that adapts DPD coefficients a and provides these to the DPD actuator 1105. The DPD as such may here thus function as in the prior art but using ILC. The result from execution is desired DPD output signals for the training of the DPD ML model.

Instead of predicting desired DPD output signals above, one can use residual predictions instead, e.g. as in Y. Wu, U. Gustavsson, A. G. Amat, and H. Wymeersch, "*Residual Neural Networks for Digital Predistortion*", published as arXiv:2005.05655 in 2020.

Figure 12:
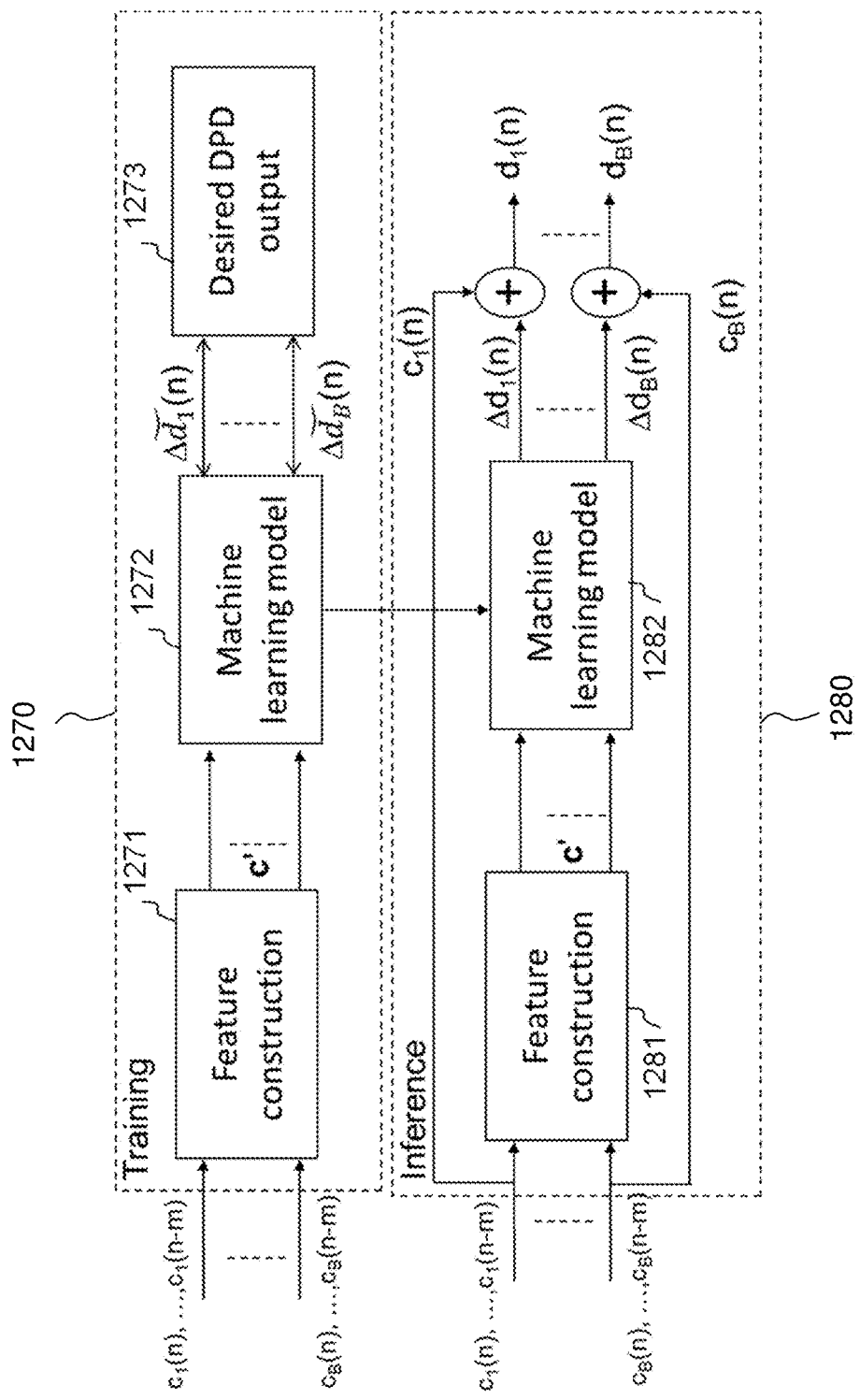
FIG. 12 schematically illustrates training and inference phases based on residuals.

For example, as above and in FIG. 11, $\tilde{d}_1, \tilde{d}_2, \ldots, \tilde{d}_B$ are ILC outputs and $d_1, d_2, \ldots, d_B$ are predicted outputs from the models. Instead of working with $\tilde{d}_1, \tilde{d}_2, \ldots, \tilde{d}_B$ one can work with the residual $\Delta \tilde{d}_1, \Delta \tilde{d}_2, \ldots, \Delta \tilde{d}_B$ where $\Delta \tilde{d}_k(n) = \tilde{d}_k(n) - c_k(n)$ for k-th band. FIG. 12 schematically illustrates such solution, i.e. training and inference phases based on residuals. As a result, the machine learning models are going to provide residual predicted outputs, which are referred to as $\Delta d_1, \Delta d_2, \ldots, \Delta d_B$ during the inference As previously, $c_1(n), c_2(n), \ldots, c_B(n)$ should be outputs from the CFR. Similarities with FIGS. 5 and 10 are clear in FIG. 12, the difference is in principle that residuals instead are used with the ML model(s). Also here training may be based on ILC and there may be a separate ML model per band.

Hence, there is also here a training block 1270 with a training feature construction part 1271, machine learning model part 1272 for training, and desired DPD output part 1273. An inference block 1280 takes clipped output signals from all bands, i.e. corresponding to $c_1, c_2, \ldots, c_{B'}$, perform feature construction according to a feature construction part 1281 and then the trained ML model(s) is applied in a ML model part 1282, thus providing $\Delta d_1, \Delta d_2, \ldots, \Delta d_B$ as output.

The residual output during inference, i.e., $\Delta d_1, \Delta d_2, \ldots, \Delta d_B$ also typically make it desirable, as shown in the figure, to add these output signals to $c_1, c_2, \ldots, c_B$, respectively and thereby form $d_1, d_2, \ldots, d_B$.

As already mentioned, the main goal of a DPD is to work like the inverse of the PA that is to be linearized. However, PA behavior changes over time and it is of interest or may even be needed to adjust DPD parameters. A machine learning based DPD as discussed above is preferably as static as possible so that retraining, at least frequently, can be avoided. One possibility may be to adapt DPD weights in the machine learning model, e.g. as in J. Sun, J. Wang, L. Guo, J. Yang, and G. Gui, "*Adaptive deep learning aided digital*

*predistorter considering dynamic envelope"* IEEE Transactions on Vehicular Technology (Volume: 69, Issue: 4, April 2020). However, this incurs signaling overhead since a lot of data needs to be exchanged. One cost-effective solution proposed and according to some embodiments, is to use an additional DPD, a so called tracking DPD. In principle any known multiband DPD structure can be used as such tracking DPD. See e.g. WO 2014188293 A2.

The reason to introduce a tracking DPD is to compensate for local and/or temporal variations in the PA system. These may arise due to varying traffic load conditions as well as environmental changes such as temperature. For example, during night time the traffic load is likely to be low and the temperature of the PA remains constant, hence the local variations would be minimal. In this case, a static machine based static DPD is sufficient to achieve the desired performance and one can turn off the tracking DPD to save energy consumption of the overall system. On the other hand, during peak hours there will be a considerable amount of variation and the ML-based static DPD may not be able to compensate efficiently. As a result, the ML-based static DPD may either need to constantly adapt those changes by re-training its parameters or the tracking DPD can be used to compensate for those local changes. In such a scenario, the tracking DPD would improve the overall performance when a machine learning based DPD is used as the "main" DPD. Besides this, the tracking DPD can be used as a monitoring entity to evaluate if the ML-based DPD needs and/or would benefit from re-training, e.g. due to age or some more persistent change in environmental conditions. For instance, when the tracking DPD would show divergence in the parameter estimations, this can be used as indication that ML-based DPD parameters may need change and the ML model(s) may need or require re-training.

Figure 13A:
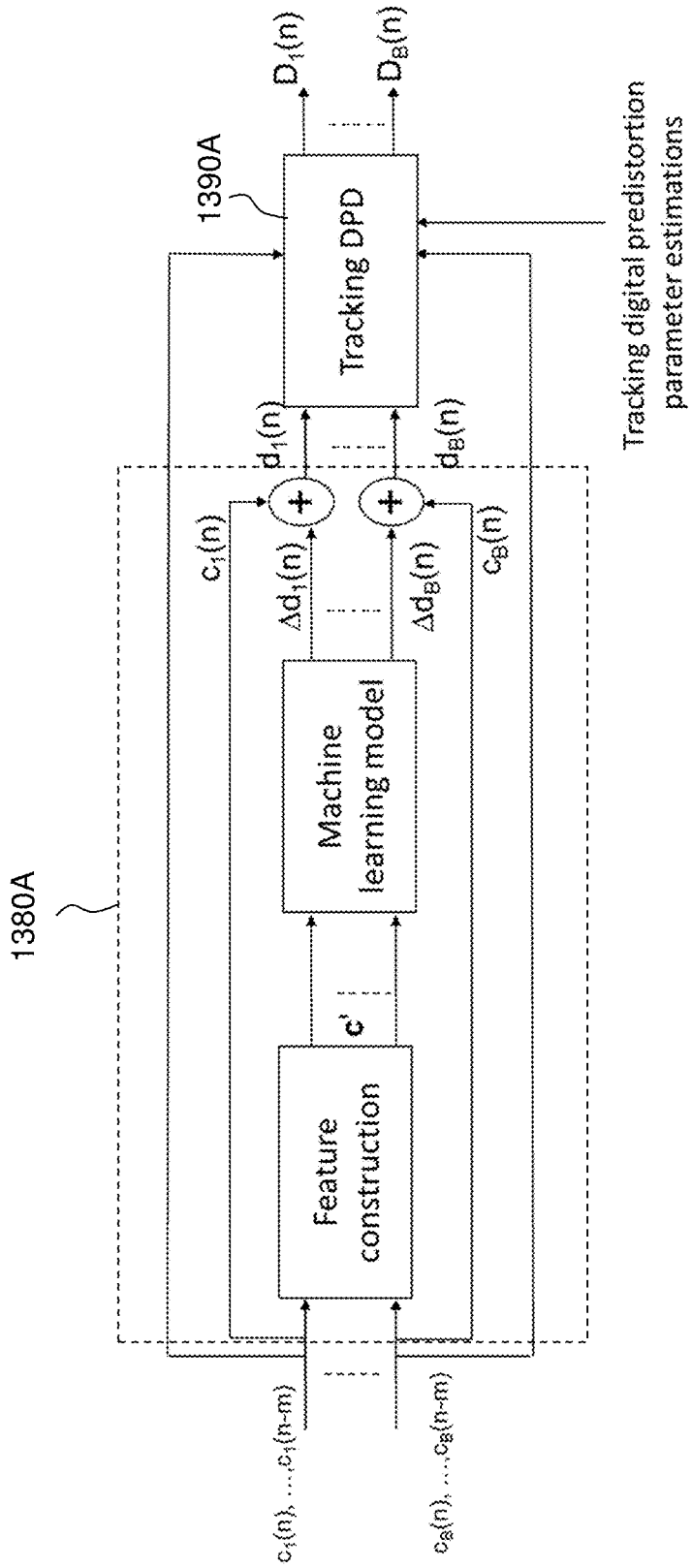
FIG. 13A illustrates how a machine learning DPD and tracking DPD can be used together and operate in cascade.

FIG. 13A illustrates how a machine learning DPD 1380A and tracking DPD 1390A, e.g. such as mentioned above, can be used together and operate in cascade, i.e. in series, during inference. Note that the machine learning DPD 1380A corresponds to the inference block 1280 of FIG. 12 and may operate and be trained as above. The tracking DPD 1390A works on the residual of the error from the machine learning DPD 1380A in order to track and compensate for local, and/or temporal, variations of the power amplifier, such as due to changes in traffic, temperature, etc. In the figure $D_1(n), D_2(n), \ldots, D_B(n)$ denote outputs from the tracking DPD and is thus, in these embodiments, the signals that are to be sent to the radio front end, e.g. digital upconverter thereof, as described above, see e.g. FIG. 4. Compared to the inference block 1280 in FIG. 12, the difference now is that additionally the tracking DPD 1390A operates on the output, i.e. on $d_1, d_2, \ldots, d_B$. The tracking DPD also has as input the same input as to the machine learning DPD, i.e. here $c_1, c_2, \ldots, c_B$, i.e. typically the output from preceding CFR. Further, the tracking DPD has tracking DPD parameters, or rather estimations of such based on TOR feedback, as input. The context of how a ML DPD and tracking DPD may operate is further described below.

Figure 13B:
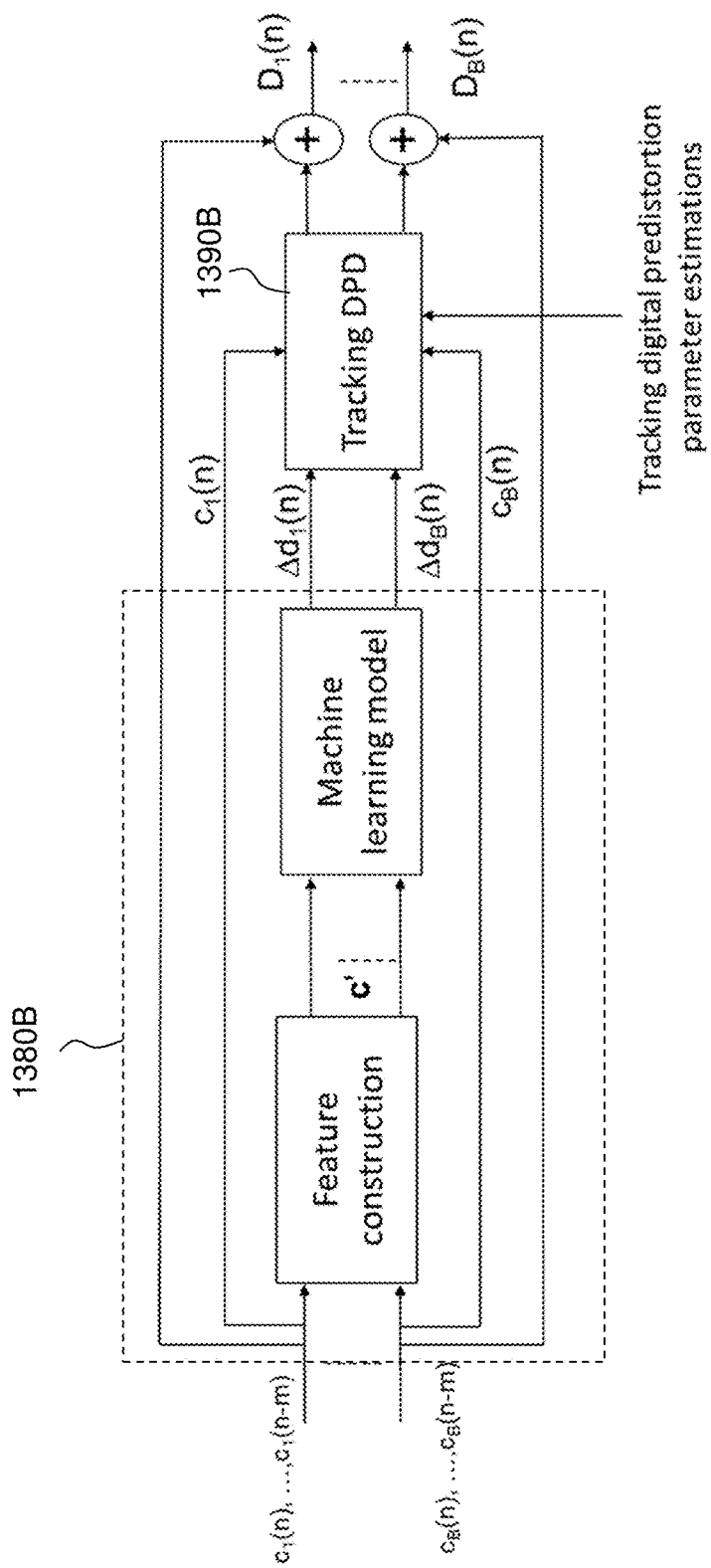
FIG. 13B shows a variant with a machine learning DPD and tracking DPD where the tracking DPD operates directly on residual output from the ML model.

FIG. 13B shows a variant where a machine learning DPD 1380B and tracking DPD 1390B similar as in FIG. 13B but where the tracking DPD 1390B instead operates directly on residual output from the ML model, i.e. on $\Delta d_1, \Delta d_2, \ldots, \Delta d_B$.

In FIGS. 13A-B the ML DPDs are based on operating on the residuals as in FIG. 12. However, it should be noted that tracking DPD of course also can be used with the full signal, as discussed in relation to FIGS. 5 and 10. Also, similar as for the ML DPD discussed above in connection with FIG. 10, the tracking DPD may be implemented with a separate tracking DPD per band.

Figure 14:
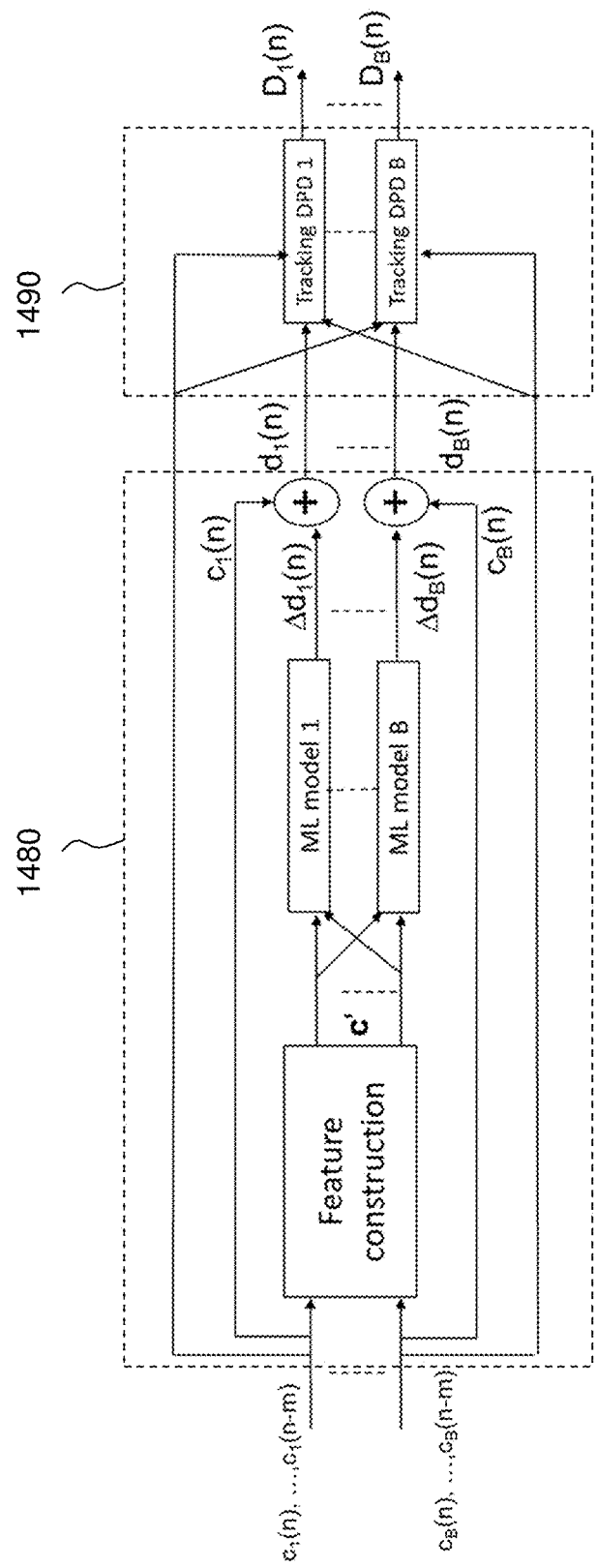
FIG. 14 shows an example of inference with separate ML models for ML DPD that operates on residuals.

FIG. 14 shows an example of inference with separate ML models, as in FIG. 10, for an ML DPD that operates on residuals, as in FIG. 13A. See machine learning DPD 1480 in the figure. There is further a separate tracking DPDs per frequency band, i.e. one per input signal, see tracking DPD 1490.

A more exact and detailed design of a tracking DPD for a certain situation, e.g. based on any of the cases and variants discussed above, depends on the overall system and its usage, as should be recognized by the skilled person, and can be optimized according to cost. For example, if the system has closely spaced bands and the IBW is about 400 MHz, then it would be beneficial to use a conventional direct lookup table wideband DPD. However, if the bands are far apart and the spectrum usage is sparse, then it may be more cost-effective to use separate DPD for separate bands. However, it depends on the designer and the requirements of the level of the linearization requirements as well as available HW resources, as recognized by the skilled person.

Experimental measurements using a wideband power amplifier have been performed using a DPD architectures as in FIG. 14. Three non-contiguous bands were used, band 3, band 1, and band 7 for RF transmission. Each band supporting multi-carriers/single carrier with 20 MHz bandwidth. Please note that the proposed architecture can handle any number of bands, and any carrier combinations.

Multiband clipping was used to o reduce PAPR of the signals and generate $c_1, c_2, \ldots, c_B$ with PAPR 9.5 dB and 3% EVM. Three separate ILC for the three bands were used where each ILC linearized 100 MHz region covering the center frequencies. The Adjacent channel leakage ratios (ACLRs) from the ILCs were approximately −55 dBc. This means that for the experiment at best there can be −55 dBc ACLR from the machine learning DPD. Raw ACLRs were around 33 dBc for all the three bands. Both training and inference phase were executed at 245 Msps. For benchmark, it was used separate DPDs with $6^{th}$ order and 4 memory taps, which provided the best performance for the setup. For the feature construction, it was we used feature construction #2 above, with a corresponding RNN machine learning model. It was used 20 million data samples for training, 4 million data samples for validation and other 4 million data samples for testing. Both validation and testing data samples were generated from different random seeds. It was used an Adam-optimizer with a learning rate 0.05, batch size of 1024 with 5 epochs. For nonlinear activation function in the dense layers, it was used the so called "tanh". A "tanh" activation function with real, imaginary, and absolute value features improve ACLR performance. LSTM layers were utilized for recurrent neural networks. Also for tracking DPD it was used a corresponding separate DPD structure as used for the benchmark. The results from the experimental measurements showed that the DPD architecture can perform at least as good as other conventional DPD in terms of ACLR. The prediction accuracy was −31.4 dB in terms of normalized mean squared error (NMSE). The results also showed that tracking DPD that captures the local behavior of the PA can improve the ACLR performance for all bands.

Above focus has mainly been on ML based DPD, that is, with reference to the architecture in FIG. 4, where at least the DPD part 440 was based on machine learning, e.g. based on what was discussed above in relation to FIGS. 5-13. Looking at the ML based CFR, where e.g. additionally or alternatively, the CFR part 420 is based on ML, much of what has been discussed is applicable also for ML based CFR.

For feature construction and machine learning models, one can follow the same procedures as explained above for DPD. For generating reference signals for the training some of prior art multiband CFR method may be used, see e.g. WO 2013014551 A1. Alternatively training can be accomplished as indicted in FIG. 15. Further, also in the case of ML based CFR, residuals can be used similarly as discussed above for DPD.

Figure 15:
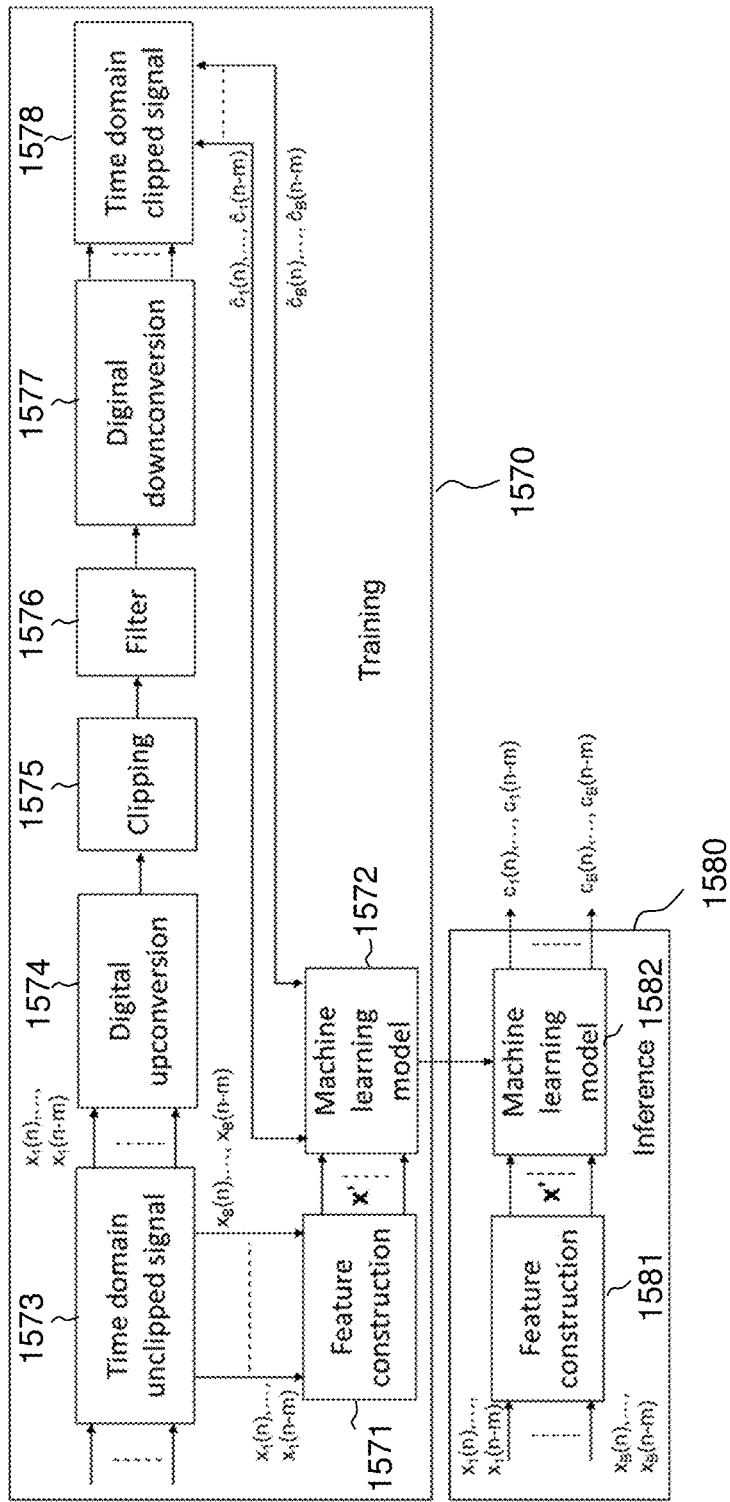
FIG. 15 schematically shows and exemplifies a machine learning based CFR architecture both for training and inference phases.

FIG. 15 schematically shows and exemplifies a machine learning based CFR architecture both for training, shown as a training block 1570, and inference, shown as an inference block 1580.

The training block 1570 comprises a training feature construction part 1571 and a machine learning model part 1572. During the training the ML model part 1572 trains a ML model, resulting in a trained ML model to be used during inference by a ML model part 1582 in the inference block 1580.

The inference block 1580 may after the training e.g. be used as the CFR part 420. For both the training and inference, the input to feature construction are signals $x_1$, $x_2$, ..., $x_B$, for current, or present, sample n, as well as for preceding m samples, as indicated in the figure, see feature construction parts 1571, 1581. As should be realized, the feature construction as such is and shall be the same for the training and inference and may simply be referred to as feature construction in the following. As already mentioned, the feature construction may preferably be as described above for ML DPD, but here applied for unclipped signals x instead of clipped signals c. The result from the feature construction are signals x', i.e. similar as c' was used above to denote feature construction output, i.e. constructed feature signals.

Also similar as above for signals c, the same denotations, here $x_1$, $x_2$, ..., $x_B$, are used for the input to both training and inference. This is to accentuate that these signals shall be of the same type and origin, such as processed correspondingly by previous modules, e.g. as illustrated in FIG. 4, and here thus correspond to unclipped signals to be CFR processed. However, the actual samples involved are of course not the same since the training is separately performed and performed before the inference that uses the result from the training.

In the training block 1570, signals $x_1$, $x_2$, ..., $x_B$ are formed by a time domain unclipped signal block 1573 and upconverted by a digital upconverter 1574. Then a clipping module 1575 performs clipping of signals which are above a certain, e.g. predefined, threshold. The threshold can be determined or predetermined from the system requirements. The clipping module 1575 thus reduces dynamic range of the signals. The signals then pass a filter 1576 for removing out of band noise. The filter 1576 module should ensure that clipping does not impact ACLR of the system. Thereafter the signals are digital upconverted by a digital downconverter 1577 in order to make clipped versions of baseband signals with same sampling rate as $x_1$, $x_2$, ..., $x_B$. Time clipped signals $\hat{c}_1$, $\hat{c}_2$, ..., $\hat{c}_B$, corresponding to desired CFR output signals are then formed by a time domain clipped signal block 1578 and used with the ML model part 1572 for training of the ML model.

Results from experimental measurements regarding a ML based CFR as above have showed that it performs as good as conventional CFR solutions. Advantageously both CFR and DPD are ML based, as will be discussed next.

Figure 16:
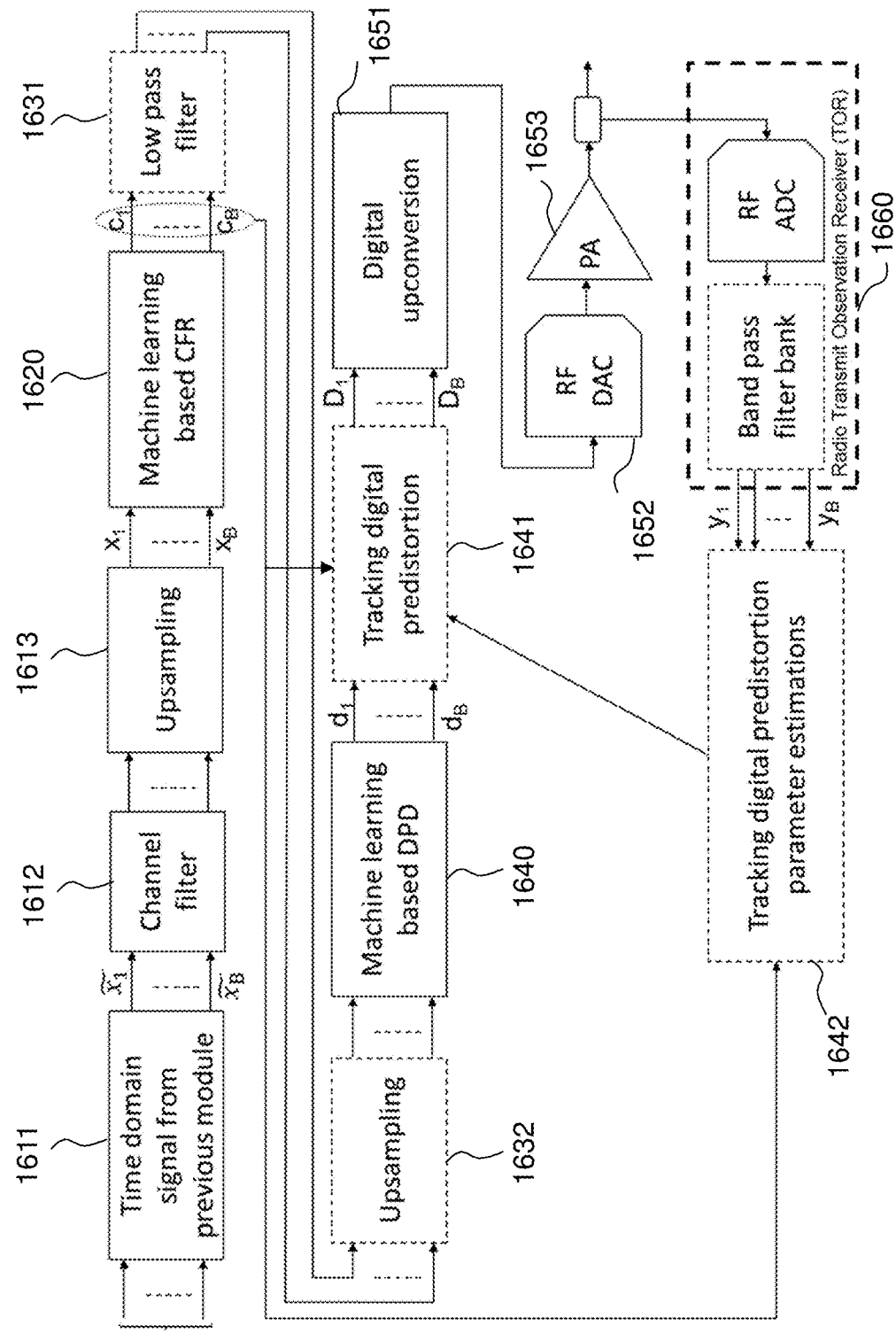
FIG. 16 schematically illustrates a machine learning transmitter architecture with both ML CFR and ML DPD.

FIG. 16 schematically illustrates a machine learning transmitter architecture based on the above and embodiments herein, with both ML CFR and ML DPD. What is shown may be compared to what was shown and described for the transmitter architecture of FIG. 4. Some parts in the architecture of FIG. 16 may operate in the same way as in a conventional transmitter architecture without ML CFR and/or ML DPD, and focus in the following will be on differences. Note that a TOR is typically used also with a conventional transmitter architecture with conventional DPD, but is not shown in FIG. 4.

In any case, the architecture shown in FIG. 16 corresponds to a multiband transmitter that receives B different frequency bands digital input signals $\widetilde{x_1}$, $\widetilde{x_2}$, ... $\widetilde{x_B}$ e.g. from a previous radio module, represented by a "time domain signal from previous module"-block 1611 in the figure. Said signals $\widetilde{x_1}$, $\widetilde{x_2}$, ... $\widetilde{x_B}$ are passed through channel filter(s) 1612 and are upsampled by an upsampler 1613 according to CFR requirements. Output from the upsampler 1613 are represented by $x_1$, $x_2$, ..., $x_B$ and are from the above recognized as input signals to CFR. The CFR here is ML based, e.g. as discussed above, and performed by a ML CFR part 1620. The output from the ML CFR part 1620 are signals $c_1$, $c_2$, ..., $c_B$, also recognized from above, which are input to a ML DPD part 440. Note that there e.g. may be a low pass filter 1631 on the output from the ML CFR part 1620 in order to reduce out of band noise generated due to clipping, and/or upsampling between CFR and DPD if e.g. CFR and DPD rates are different, illustrated by an upsampler 1632 in the figure. The ML DPD part 1640 generates a DPD output, i.e. signals $d_1$, $d_2$, ..., $d_B$ in the figure, recognized as well from the above. This output from the ML DPD part 1640 may then be input to a tracking DPD part 1641, recognized from above as well. The output of the tracking DPD part 1641 are signals $D_1$, $D_2$, ..., $D_B$ just as above. These, or if there is no tracking DPD part 1641 or it is inactivated instead the signals $d_1$, $d_2$, ..., $d_B$, are sent for digital upconversion, in the figure illustrated by a digital upconverter 1651. The output thereof is being sent to a RF DAC 1652 and thereafter to a PA 1653 that connects to an antenna for wireless transmission of the power amplified RF signals, e.g. as wireless transmission from a base station, e.g. 110, of a wireless communication network, e.g. 100. It can be noted that the PA 1653 is for all B frequency bands, e.g. non-contiguous bands. A TOR 1660 feedback result after the power amplification to a tracking DPD parameter block 1642 that as another input have the signals $c_1$, $c_2$, ..., $c_B$, that first may have been low pass filtered. Note that the TOR 1660 may comprise a band pass filter bank similarly as discussed above to provide separate signals $y_1$, $y_2$, ..., $y_B$, i.e. one per band. The signals $y_1$, $y_2$, ..., $y_B$ are complex baseband signals corresponding and contain signals up to linearization bandwidth which is typically 5 times of the bandwidth of the signal. The tracking DPD parameter block 1642 thus makes sure that the tracking DPD can take care of local and temporal changes in the PA behavior and that the ML DPD part 1640 thereby, after training, can operate more as a static DPD, with benefits as indicated above.

Figure 17A:
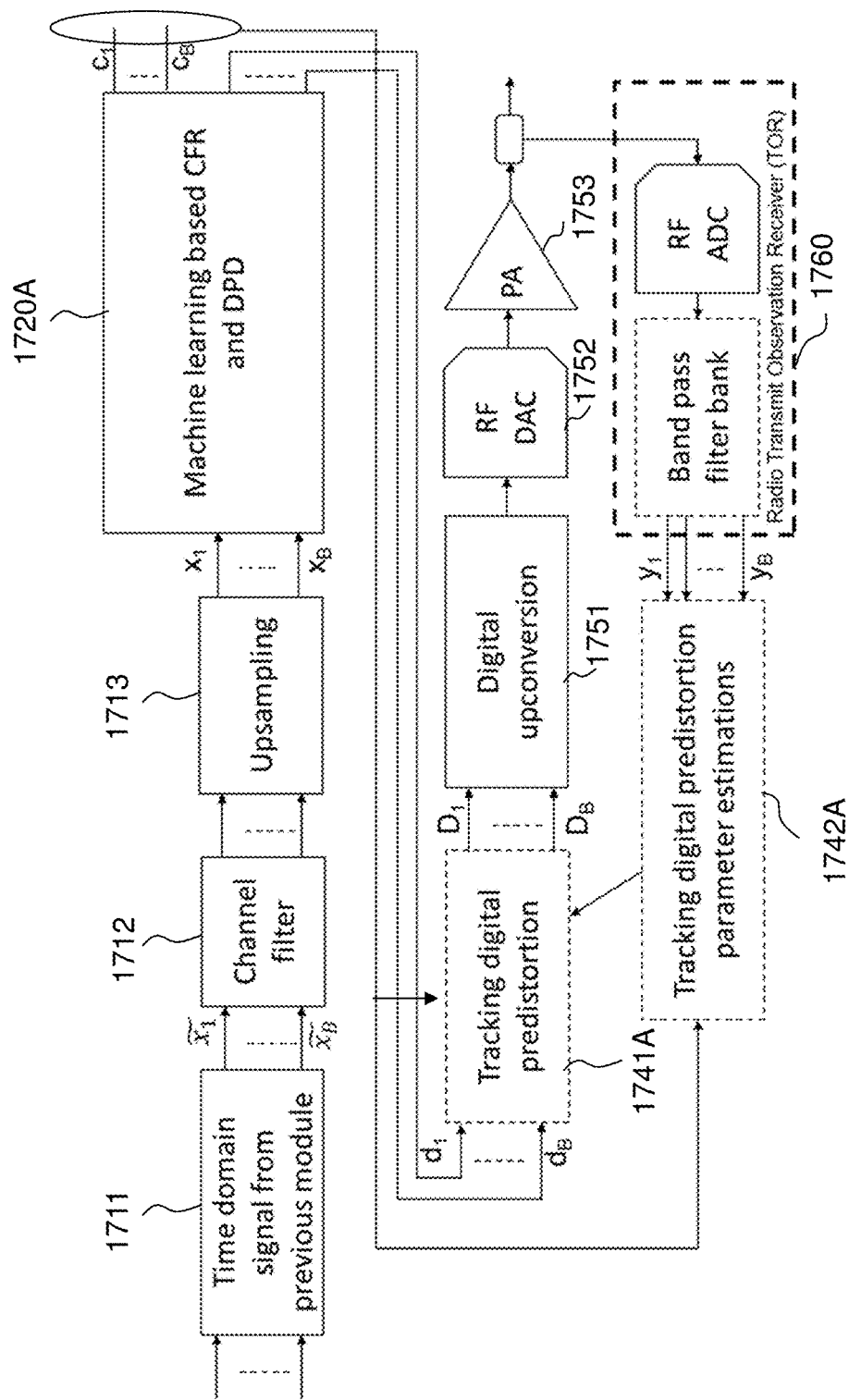
FIG. 17A schematically illustrates another machine learning transmitter architecture with jointly implemented ML CFR and ML DPD.

FIG. 17A schematically illustrates another machine learning transmitter architecture based on the above and embodiments herein, with both ML CFR and ML DPD but here jointly implemented. What mainly differs compared to the architecture of FIG. 16 is thus that there is a single ML CFR and DPD part 1720A. Parts that may be and operate more or less the same as their counterpart in FIG. 16 include "time domain signal from previous module"-block 1711, channel filter(s) 1712, upsampler 1713, digital upconverter 1751, RF DAC 1752, PA 1753 and TOR 1760.

The ML as such for ML CFR and DPD part 1720A may, as should be realized, be based on and what have been described above for ML DPD and ML CFR, and preferably with the same feature construction, with ILC used during the training etc. The training of the joint ML for CFR and DPD is also separately commented below.

As can be seen there is also here a tracking DPD part 1741A that is separate, allowing for more static ML based CFR and DPD, enabling better performance and/or facilitating use of ML based CFR and DPD since it reduces need for more frequent retraining, and can thereby also enable less complex ML implementation. However, a challenge in this situation is to generate reference signals for the tracking DPD parameter estimations. If $x_1, x_2, \ldots, x_B$ would be used as reference signals for tracking DPD, then tracking DPD would follow the unclipped version of the signals. As a result, the modifications coming from the CFR part would be cancelled and PAPR regrowth would occur. Therefore, when a tracking DPD is used in the situation with joint ML CFR and DPD, $x_1, x_2, \ldots, x_B$ should not be as reference signals for tracking DPD parameter estimations. A solution may therefore be to configure and train the ML so that it not only generates $d_1, d_2, \ldots, d_B$ as output, but also signals corresponding to $c_1, c_2, \ldots, c_B$, above, i.e. corresponding to output of CFR. In other words, to train the ML CFR and DPD block 1720 to generate two types of output signal, that is, signals $c_1, c_2, \ldots, c_B$ corresponding to a CFR output in addition to joint CFR DPD output signals corresponding to $d_1, d_2, \ldots, d_B$. Note that the CFR output is only needed for embodiments with the tracking DPD. Hence, with this solution the tracking DPD part 1741A and a tracking DPD parameter block 1742A, as shown in the figure, has same kind of input signal and may operate as their counterparts in the architecture of FIG. 16.

Figure 17B:
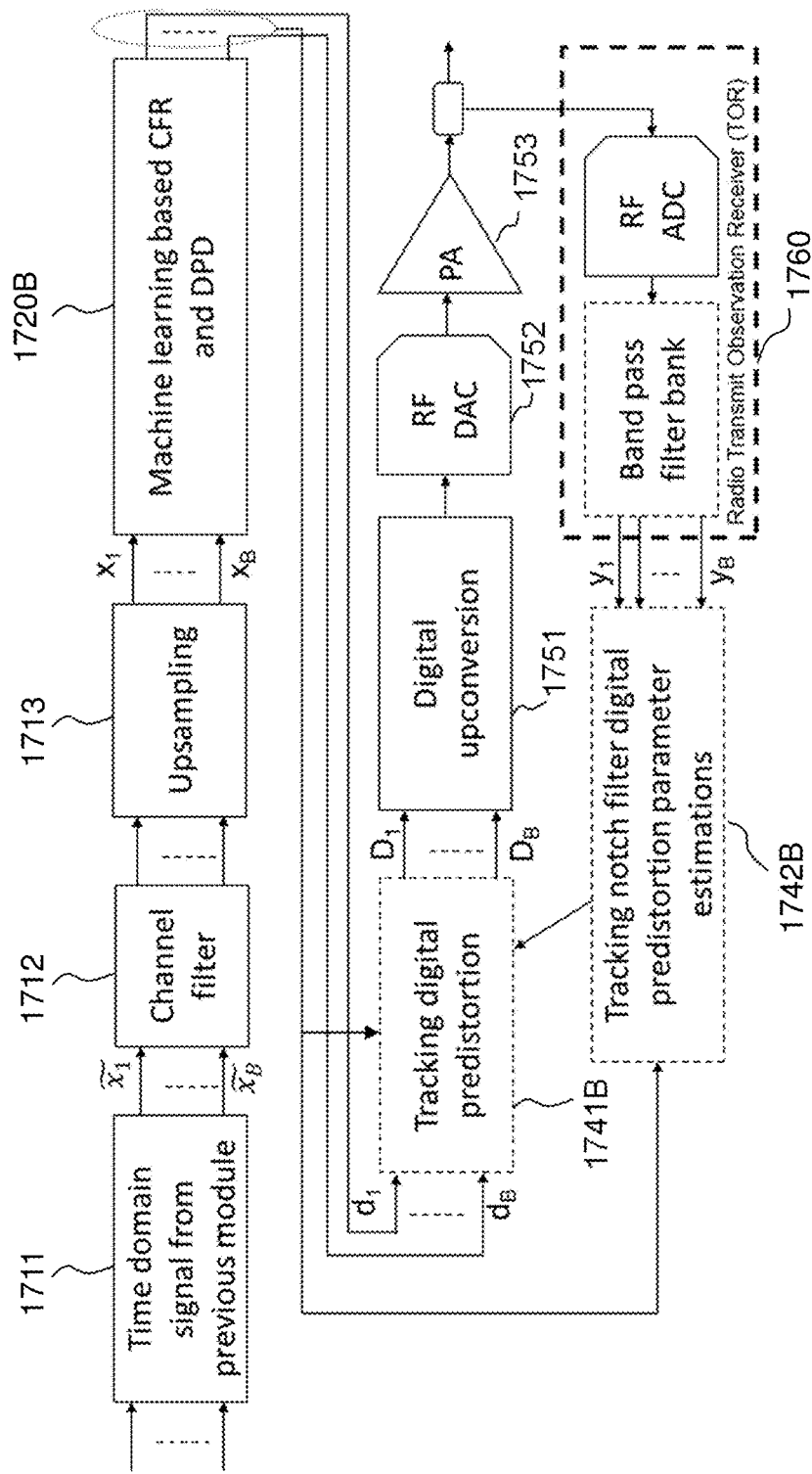
FIG. 17B schematically illustrates another machine learning transmitter architecture based joint ML CFR and DPD.

FIG. 17B schematically illustrates another machine learning transmitter architecture based joint ML CFR and DPD.

The approach here is to design the tracking DPD so that it does not require reference signals $c_1, c_2, \ldots, c_B$ in the parameter estimations. The parts shown in the figure and that mainly differs compared to what is shown in FIG. 17A are those ending with a B in FIG. 17B. The rest of the parts are having corresponding reference numerals as in FIG. 17B but starting with 17 instead of 16. Hence, in FIG. 17B there is a single ML CFR and DPD part 1720B but without any output of signals corresponding to $c_1, c_2, \ldots, c_B$. Further, there is a tracking DPD part 1741B and a tracking DPD parameter block 1742B. To reduce the need of $c_1, c_2, \ldots, c_B$ as reference signals, the PA output is passed through notch filter(s) which removes in carrier part(s). This filter may be applied on the signals by a tracking DPD parameter block 1742B. A perfect reference signal only contains an in carrier part, i.e. with no component outside of the carrier. Hence a reference signal is not required in this case. The tracking DPD in this case, implemented by the tracking DPD part 1741B and the tracking DPD parameter block 1742B, does not require or use signals corresponding to $c_1, c_2, \ldots, c_B$ and may be referred to as a tracking notch filter DPD. It only focuses on the outside of the carriers and improves ACLR, however, does not change anything inside the carrier. Since CFR alters only inside the carrier signals, the tracking DPD does not hamper the CFR mechanism and no PAPR regrowth will occur.

Figure 18:
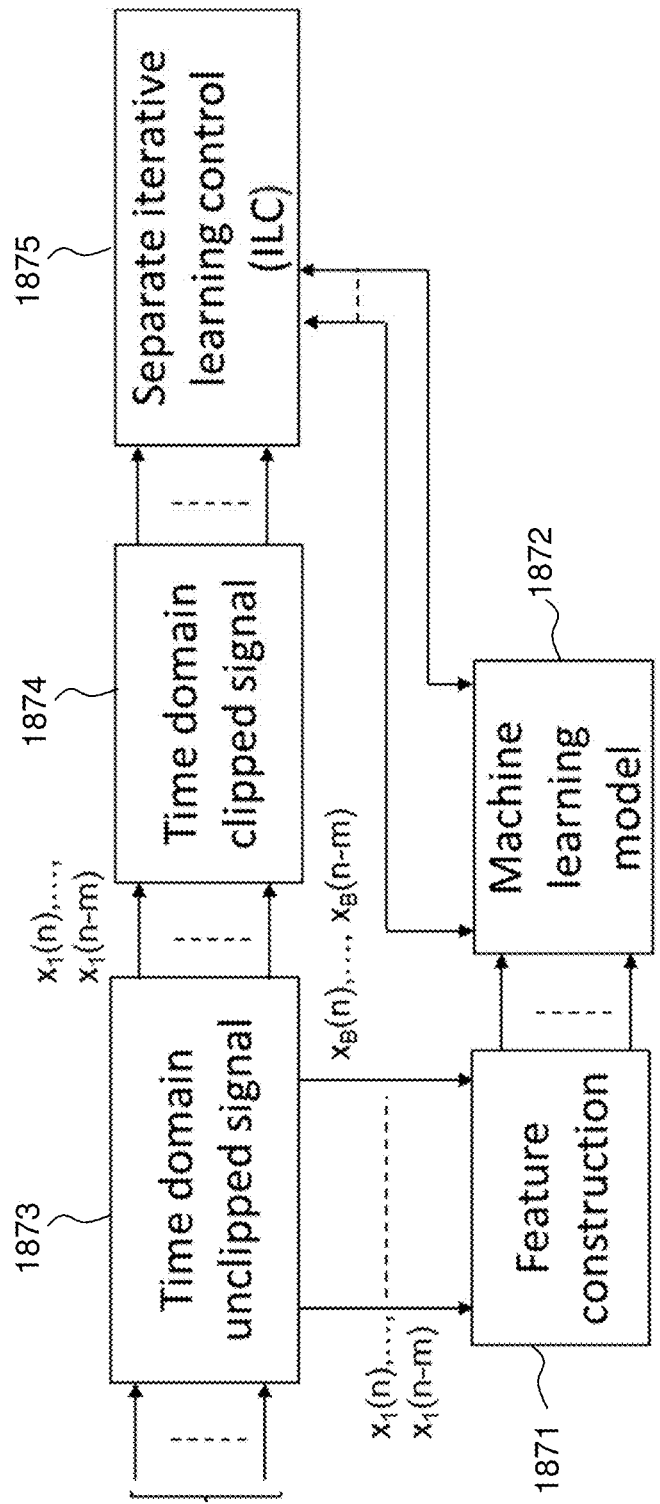
FIG. 18 schematically illustrates a training phase arrangement for a ML based joint CFR and DPD multiband transmitter.

FIG. 18 schematically illustrates a training phase arrangement for ML based joint CFR and DPD multiband transmitter architecture, showing how unclipped signals, e.g. $x_1, x_2, \ldots, x_B$, are used as input for the machine learning model but where the desired output is clipped ILC output. The ILC may be a separate ILC as discussed above. Hence, in the figure there are signals $x_1, x_2, \ldots, x_B$ formed by a time domain unclipped signal block 1873. Time domain clipped signals are accomplished for the training by a time domain clipped signal block 1874, e.g. similarly as such signals are accomplished in the training phase with the architecture shown in FIG. 15. The clipped signals are then fed to a ILC block 1875 that e.g. may operate similarly as the separate ILC discussed above, e.g. in connection with FIG. 11. The ILC block 1875 operates with a ML model part 1872 for training of the ML model or models used, i.e. similarly as discussed above when ILC for training as discussed. There is also a feature construction part 1871 that preferably operate as described above and on the unlipped signals $x_1, x_2, \ldots, x_B$.

Figure 19:
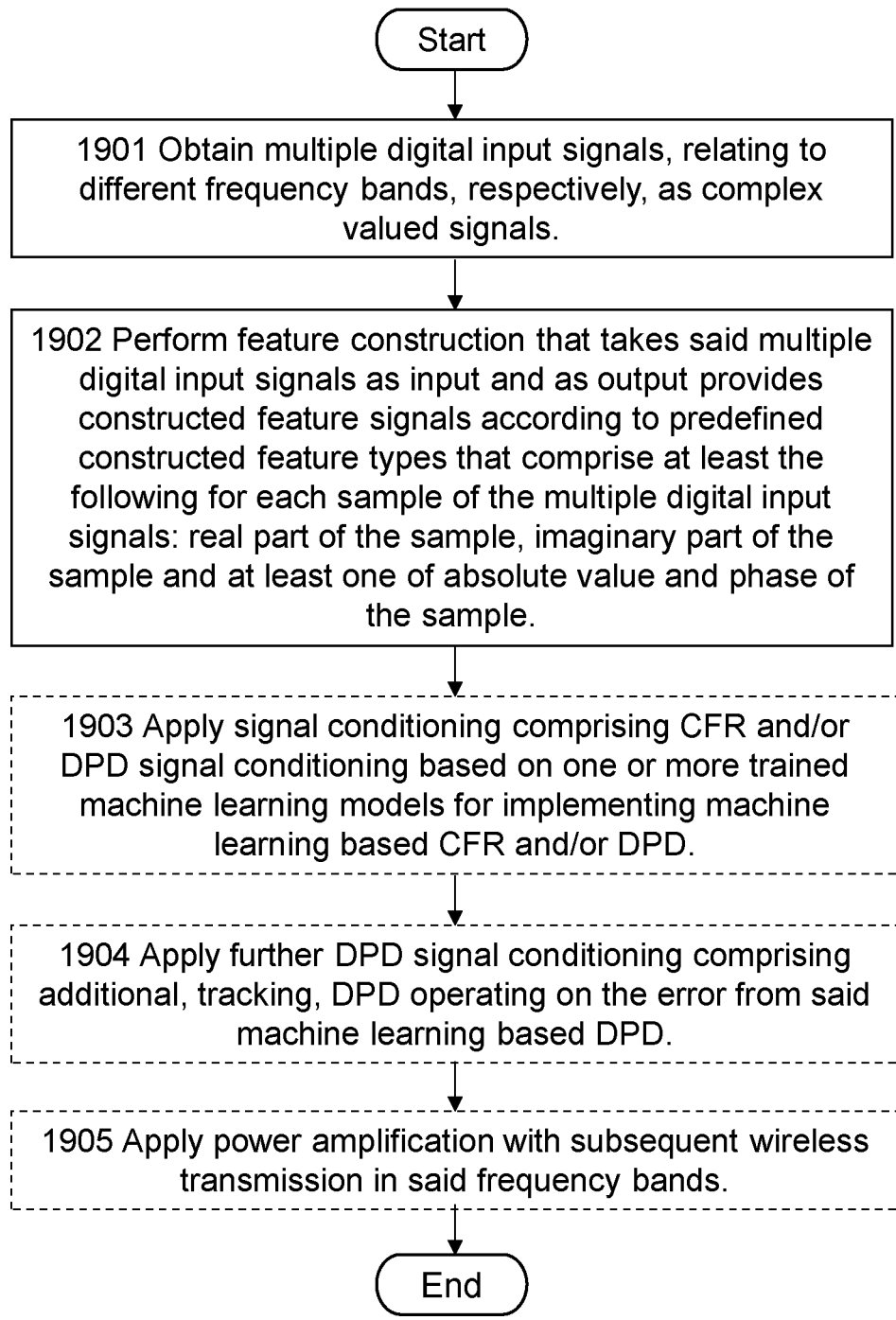
FIG. 19 is a flowchart schematically illustrating embodiments of a method according to embodiments herein.

FIG. 19 is a flowchart schematically illustrating embodiments of a method according to embodiments herein. The method is for supporting performance of machine learning based crest factor reduction, i.e. CFR, and/or digital predistortion, i.e. DPD, on multiple digital input signals, e.g. x1 . . . xB or c1 . . . cB in examples above, relating to different frequency bands, respectively. There may e.g. be B frequency bands as in the above examples. The signals x1 . . . xB or c1 . . . cB may herein collectively be referred to as x or c to simplify. The CFR and/or DPD is performed in order to signal condition said signals before power amplification, e.g. by any PA in the examples above, and subsequent transmission in said frequency bands by a wireless communication network, e.g. the wireless communication network 100.

The B frequency bands may be non-contiguous, i.e. distributed with substantial frequency spaces between within an IBW associated with a power amplifier to be used. The IBW may be categorized as wideband and e.g. in the magnitude of or greater than 1 GHz. However, the method may equally be applied to systems with contiguous bands.

The method may be performed by one or more devices that may correspond to or be comprised in or comprise such CFR and/or DPD architectures, or related arrangements, as exemplified and indicated above, e.g. as in FIGS. 6-10, 12-17. Said device(s) may further e.g. correspond to or be comprised in the wireless communication network 100, or e.g. the radio network node 110 or some other network node(s) of the wireless communication network 100, that provides signals to be used in wireless transmission by the radio network node 110.

The actions below that may form the method may be taken in any suitable order and/or be carried out fully or partly overlapping in time when this is possible and suitable.

Action 1901

Said device(s) obtains said multiple digital input signals, e.g. x or c, as complex valued signals. They typically corresponds to baseband signals and may be referred to as complex baseband signals or similar.

This action may fully or partly correspond to how signals x and c are obtained in examples above and may in some embodiments relate to that said device(s) receive the signals from a preceding entity, e.g. module, unit or node.

Action 1902

Said device(s) perform feature construction that takes said multiple digital input signals, e.g. x or c, as input and provides constructed feature signals, e.g. x'; c', according to predefined, or even predetermined, constructed feature types as output. The predefined constructed feature types may be as discussed above, e.g. in relation to FIGS. 6-7. Hence, said predefined constructed feature types relate to at least the following per complex valued sample of the obtained complex valued multiple digital input signals: the real part of the sample, the imaginary part of the sample and at least one of the absolute value of the sample and the phase of the sample. The real part, i.e. the value of a real part of an imaginary value representing the sample, may herein be abbreviated I. The imaginary part, i.e. the value of an imaginary part of the imaginary value representing the sample, may herein be abbreviated Q. The absolute value, i.e. the magnitude of the real and imaginary parts of the imaginary value representing the sample may herein be abbreviated A. The phase, i.e. the phase or angle between the real and imaginary parts of the imaginary value representing the sample may herein be abbreviated P.

As realized from the above, said constructed feature signals, e.g. x', c', are intended to be used as input to one or more ML models, each taking said constructed feature signals as input, and that provide CFR and/or DPD signal conditioned multiple digital output signals as output. When x' is input, the output is typically c and/or d. When c' is input the output is typically d. The ML model may be a trained ML model, associated with one or more trained ML algorithms, used during inference. In other embodiment the ML model may be trained during application of some embodiments herein, where one or more training ML algorithms may be used for training of the ML model to accomplish said trained ML model. Feature construction like this, further described below and elsewhere herein, facilitate ML based CFR and/or DPD and makes it possible with CFR and DPD when the IBW is wideband, even in the magnitude of GHz, and with non-contiguous bands, i.e. when said frequency bands B are non-contiguous. There may be one or several carriers within each band. Results from such ML based CFR and/or DPD has can be comparable to prior art CFR and/or DPD methods for single band or multiple contiguous bands input signals.

In some embodiments, said feature construction takes said multiple digital input signals, e.g. x or c, as input and per present complex valued sample, e.g. for each $x(n)$ or $c(n)$ of each signal $x1 \ldots xB$ or $c1 \ldots cB$, and it is provided at least the following constructed feature signal samples as constructed feature output associated each present complex valued sample, e.g. each $x(n)$ or $c(n)$, of the signal: The real part, e.g. I, of the present sample, e.g. of $x(n)$ or $c(n)$. The imaginary part, e.g. Q, of the present sample. At least one of the absolute value, e.g. A, of the present sample and the phase, e.g. P, of the present sample.

Advantageously, to enable better results from the ML, said feature construction should also consider memory, or delay, terms. Hence, in some embodiments, the feature construction for each of said present complex valued samples, e.g. $x(n)$ or $c(n)$, also considers one or more, e.g. m, preceding complex valued samples and provides, for each such preceding complex valued sample, e.g. $x(n-1) \ldots x(n-m)$ or $c(n-1) \ldots c(n-m)$, at least the following constructed feature signal samples as further output associated with said present complex valued sample, e.g. with each $x(n)$ or $c(n)$ of the signal: The real part, e.g. I, of the preceding sample. The imaginary part, e.g. Q, of the preceding sample. At least one of the absolute value, e.g. A, of the preceding sample and the phase, e.g. P, of the preceding sample.

For embodiments as above, it may be preferred to construct the feature signals corresponding to using I, Q, and A over I, Q and P. Using I, Q, A and also P may improve further.

In some embodiments, the output of constructed feature signals, e.g. x' or c', corresponds to samples comprised in one or more 1-dimensional data structures with data grouped per digital input signal, e.g per $x1 \ldots xB$ or $c1 \ldots cB$, of said multiple digital input signals. There may e.g. be one or several, e.g. B, 1-dimensional data structures, e.g. B vectors, when there are B frequency bands and B input signals, or e.g. a single vector for all B input signals. With constructed feature signal samples e.g. I, Q, A, i.e. three per complex valued sample, the length of each vector will thus be three times the total of samples involved e.g. m+1 when also memory or delay terms are involved.

In some embodiment, the output of constructed feature signals, e.g. x'; c', instead corresponds to samples comprised in a 2-dimensional data structure with number of a total of samples, e.g. m+1, considered for each digital input signal, e.g. each one of x or c, in one dimension and the constructed feature signal samples for all the multiple digital input signals in the other dimension. That is, there may be one structure with all output constructed features of present complex valued samples, e.g. of $x(n)$ or $c(n)$, for all B multiple digital input signals, e.g. for all B number of signals. There may e.g. be a 2D matrix with rows corresponding to present sample (n) and memory terms, i.e. preceding samples, n-1 ... n-m, and columns with the all the constructed features samples for the multiple digital input signals. With constructed feature signal samples I, Q, A, i.e. three per complex valued sample, the number of columns may thus be three times the B number of signals.

This action may fully or partly correspond to what was discussed and shown in above in relation to FIGS. 6-7.

Action 1903

Said device(s) may apply CFR and/or DPD signal conditioning based on one or more trained machine learning models implementing said machine learning based CFR and/or DPD. Each of said trained machine learning models taking said constructed feature signals, e.g. x' or c', as input, and where said trained machine learning models provide CFR and/or DPD first signal conditioned multiple digital output signals, e.g. cord as output.

As should be realized by the skilled person, signal conditioning as used herein generally refers to the manipulation of a signal in a way that prepares it for a next stage of processing. When the signal conditioning involves DPD, the signal conditioning is about accomplishing an inverse of the effect from the power amplifier non-linearities, whereby the signals after the PA become linearized compared to a situation without the DPD. When the signal conditioning involves CFR, or reduction of peak to average power ratio (PAPR) as it may alternatively be named, the signal conditioning is about reducing the dynamic range of the signals thereby facilitating operation of the power amplifier that else need operate with a higher dynamic range than desirable or to operate in the linear region, leading to increased cost of the PA and/or reduces PA's efficiency. As used herein, crest factor reduction or CFR, refers to any technique that reduces dynamic range of the input signal power to reduce PAPR.

Further, as should be realized, said multiple digital input signals are preferably baseband signals.

Said machine learning model(s) may be based on any one of many types of machine learning, e.g. neural network(s), random forest, gradient boosting, nonlinear regression, multilayer perception etc. as discussed above. It may particularly be efficient to perform machine learning based CFR and DPD jointly as explained herein and further below.

Same as with example above, said one or more trained ML models may be a common and/or single model for all digital input signals, i.e. for all frequency bands B, or may be a separate model per signal, i.e. per band. In such case each model, e.g. for a certain band, should have all of said constructed feature signals as input, but provide one of said signal conditioned multiple digital output signals as output, corresponding to the band in question. With separate model per signal, the models are typically, although not necessary, of the same type of machine learning and thus the same type of model, or algorithm, is used, e.g. based on neural network or another type of machine learning. The separate models may be trained separately although the shared input signals would typically make simultaneous or combined training desirable and efficient in practice.

As should be realized, said one or more trained machine learning models should have been trained using digital input training signals according to said predefined constructed feature types and digital output training signals that correspond to desired signal conditioning for these training digital input training signals. Training may be performed base on the above examples, The desired signal conditioning is advantageously, but not necessary, accomplished by means of ILC as discussed and exemplified in some detail separately herein.

In some embodiments, said CFR and/or DPD signal conditioning comprises both CFR and DPD. In these embodiments, the signal conditioned multiple digital output signals have thus been signal conditioned with respect to both CFR and DPD, with one or both of them being based on machine learning.

In some embodiments, the CFR and DPD are separately and subsequently applied. The CFR may operate on said received multiple digital input signals, e.g. x, and provide CFR multiple digital output signals, e.g. c. The DPD may then subsequently operate on said CFR multiple digital output signals, e.g. c, and provide said signal conditioned multiple digital output signals, e.g. d. Both the CFR and DPD may be based on machine learning.

In some embodiments, the CFR and DPD are instead and advantageously jointly applied with said one or more trained machine learning models being common for both the CFR and the DPD. Here the jointly applied CFR and DPD operates on said received multiple digital input signals, e.g. x, and provides said first signal conditioned multiple digital output signals, e.g. d.

This action may fully or partly correspond to what was discussed and shown above regarding the inference phases.

Action 1904

Said device(s) applying further DPD signal conditioning comprising an additional, tracking, DPD that operates on the error from said machine learning based DPD and provides DPD second signal conditioned multiple digital output signals, e.g. D, as output.

This action may thus be performed when said CFR and/or DPD signal conditioning comprises said machine learning based DPD.

The error, corresponding to the residual, or difference, of the signal input to the ML DPD and the PA output, should thus correspond to short term temporal changes of the PA, not handled by the ML based DPD.

Said tracking DPD thus being another DPD, separate from said machine learning based DPD, e.g. based on a conventional, non-ML based DPD See examples and discussions above, e.g. in relation to FIGS. 13-14, 16-17. As should be realized, said residual of the error corresponds to the difference between the input, e.g. c, to the machine learning based DPD and the output of the machine learning based DPD, e.g. d. In other words, the tracking DPD may operate on the input to the machine learning based DPD, i.e. typically the output from the CFR, and the output, e.g. d, of the machine learning based DPD.

As may be realized and explained above, the main purpose of the tracking DPD is to compensate for local and/or temporal variations in the PA, e.g. use to varying traffic load conditions as well as environmental changes such as temperature. With little local variations the ML based DPD can be static and still provide good results. In practice there may e.g. be small variations during night time with low traffic and often more stable temperatures, but e.g. during day time the ML-based DPD may need to adapt to local variations in order to provide satisfactory results, and may need to be retrained. With the tracking DPD this can be avoided and the local variations be handled by the tracking DPD instead. Hence the tracking DPD have an effect of improving performance and relax requirements on the ML based DPD, and e.g. removing the need for frequent retraining. Additionally or alternatively the tracking DPD can be used to provide indication of when retraining of the ML based DPD may be suitable or needed.

For some of said embodiments where CFR and DPD are jointly applied with said one or more trained machine learning models being common for both the CFR and the DPD, said one or more trained machine learning models that are common for both the CFR and the DPD additionally provide CFR signal conditioned multiple digital output signals, e.g. c, to be used as or for use as input to said tracking DPD for the provision of said residual error. That is, the trained machine learning models should in this case be trained to also provide c. Hence, although the joint application of CFR and DPD does not require c to be provided, signals corresponding to c are here still provided for input to the tracking DPD and the tracking DPD can be applied with the above mentioned associated advantages. In the case of separate CFR and DPD, the output signals c from the CFR are already available for the tracking DPD. In the case of only DPD and no CFR, the input signal x is directly fed to the ML based DPD and also available for the tracking DPD.

This action may fully or partly correspond to what was discussed and shown above regarding tracking DPD.

Action 1905

Said device(s) may apply said power amplification and said wireless transmission based on the signal conditioned multiple digital output signals, e.g. c or d. Said power amplification being performed with a single power amplifier for all of said different frequency bands. That is, the PA operates over the IBW comprising said multiple frequency bands B.

This action may fully or partly correspond to what was discussed and shown above regarding PA and transmission.

Figure 20:
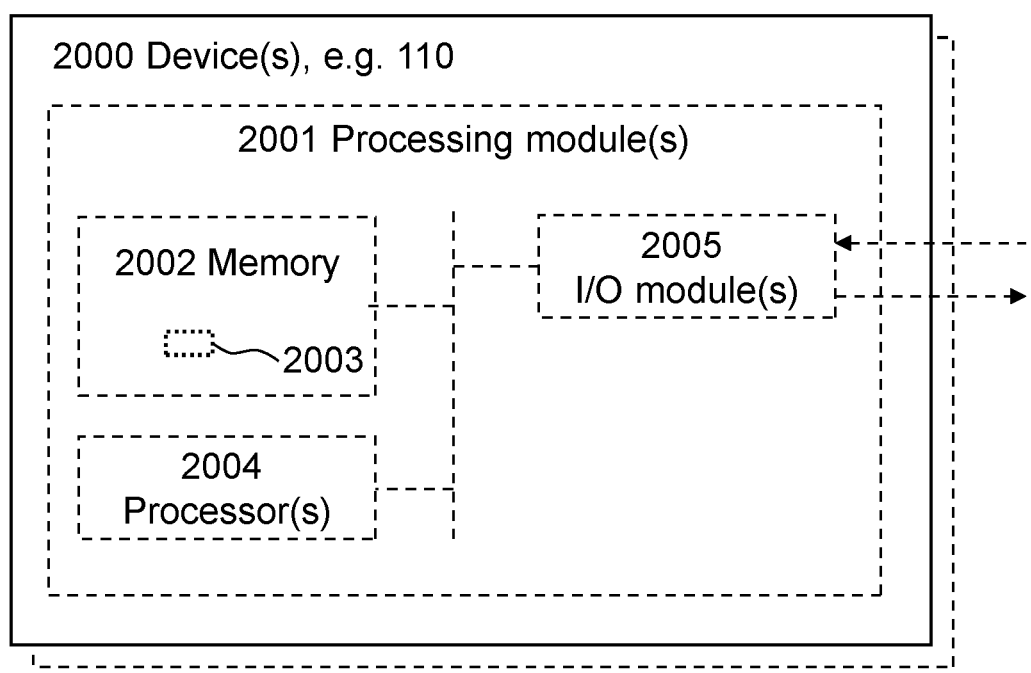
FIG. 20 is a schematic block diagram for illustrating embodiments of how one or more devices may be configured to perform the method and actions discussed in connection with FIG. 19.

FIG. 20 is a schematic block diagram for illustrating embodiments of how one or more devices 2000 may be configured to perform the method and actions discussed above in connection with FIG. 19. The device(s) 2000 may e.g. correspond to or be comprised in or comprise such CFR and/or DPD architectures, or related arrangements, as exemplified and indicated above, e.g. as in FIGS. 6-10, 12-17. Said device(s) may further e.g. correspond to or be comprised in the wireless communication network 100, or the radio network node 110 or some other network node(s) of the wireless communication network 100, e.g. that provides signals to be used in wireless transmission by the radio network node 110.

Hence, said device(s) 2000 are for supporting performance of machine learning based CFR and/or DPD on multiple digital input signals, e.g. $x1 \ldots xB$ or $c1 \ldots cB$, relating to different frequency bands, respectively. The CFR and/or DPD is/are performed in order to signal condition said signals before power amplification, e.g. by any PA in the examples above, and subsequent transmission in said frequency bands by a wireless communication network, e.g. the wireless communication network 100.

The device(s) 2000 may comprise processing module(s) 2001, such as a means, one or more hardware modules, including e.g. one or more processors, and/or one or more software modules for performing said method and/or actions.

The device(s) 2000 may further comprise memory 2002 that may comprise, such as contain or store, computer program(s) 2003. The computer program(s) 2003 comprises 'instructions' or 'code' directly or indirectly executable by the device(s) 2000 to perform said method and/or actions. The memory 2002 may comprise one or more memory units and may further be arranged to store data, such as configurations and/or applications involved in or for performing functions and actions of embodiments herein.

Moreover, the device(s) 2000 may comprise processor(s) 2004, i.e. one or more processors, as exemplifying hardware module(s) and may comprise or correspond to one or more processing circuits. In some embodiments, the processing module(s) 2001 may comprise, e.g. 'be embodied in the form of' or 'realized by' processor(s) 2004. In these embodiments, the memory 2002 may comprise the computer program 2003 executable by the processor(s) 2004, whereby the device(s) 2000 is operative, or configured, to perform said method and/or actions thereof.

Typically the device(s) 2000, e.g. the processing module(s) 2001, comprises Input/Output (I/O) module(s) 2005, configured to be involved in, e.g. by performing, any communication to and/or from other units and/or devices, such as sending and/or receiving information to and/or from other devices. The I/O module(s) 2005 may be exemplified by obtaining, e.g. receiving, module(s) and/or providing, e.g. sending, module(s), when applicable.

Further, in some embodiments, the device(s) 2000, e.g. the processing module(s) 2001, comprises one or more of an obtaining module(s), performing module(s), applying module(s), as exemplifying hardware and/or software module(s) for carrying out actions of embodiments herein. These modules may be fully or partly implemented by the processor(s) 2004.
Hence:

The device(s) 2000, and/or the processing module(s) 2001, and/or the processor(s) 2004, and/or the I/O module(s) 2005, and/or the obtaining module(s) are thus operative, or configured, to obtain said multiple digital input signals as complex valued signals.

The device(s) 2000, and/or the processing module(s) 2001, and/or the processor(s) 2004, and/or the I/O module(s) 2005, and/or the performing module(s) are further operative, or configured, to perform said feature construction that takes said multiple digital input signals as input and provides constructed feature signals according to said predefined constructed feature types as output.

In some embodiments, the device(s) 2000, and/or the processing module(s) 2001, and/or the processor(s) 2004, and/or the I/O module(s) 2005, and/or the applying module(s) are operative, or configured, to apply said CFR and/or DPD signal conditioning based on said one or more trained machine learning models implementing said machine learning based CFR and/or DPD.

In some embodiments, the device(s) 2000, and/or the processing module(s) 2001, and/or the processor(s) 2004, and/or the I/O module(s) 2005, and/or the applying module(s) are further operative, or configured, to apply said power amplification and said wireless transmission based on the signal conditioned multiple digital output signals.

In some embodiments, the device(s) 2000, and/or the processing module(s) 2001, and/or the processor(s) 2004, and/or the I/O module(s) 2005, and/or the applying module(s) are further operative, or configured, to apply said further DPD signal conditioning comprising said additional, tracking, DPD.

Figure 21:
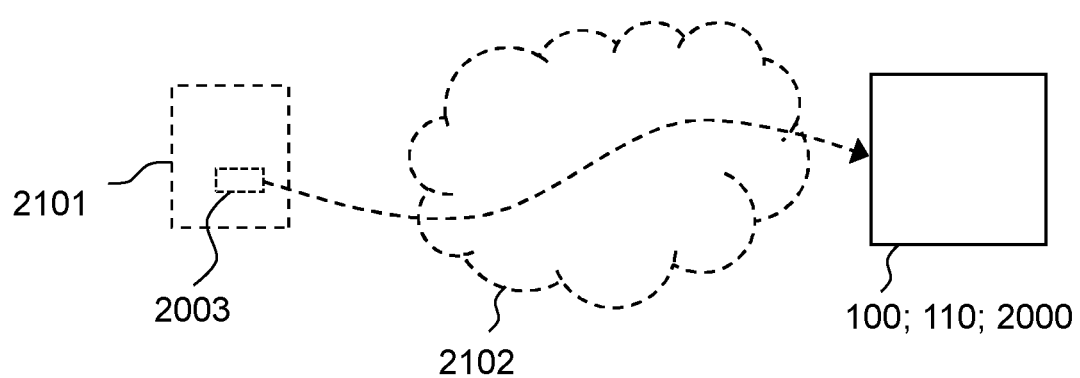
FIG. 21 is a schematic drawing illustrating some embodiments relating to computer program(s) and carriers thereof to cause the device(s) to perform said method and related actions.

FIG. 21 is a schematic drawing illustrating some embodiments relating to computer program(s) and carriers thereof to cause said device(s) 2000 discussed above to perform said method and related actions. The computer program(s) may be the computer program(s) 2003 and comprises instructions that when executed by the processor(s) 2004 and/or the processing module(s) 2001, cause the device(s) 2000 to perform as described above. In some embodiments there is provided carrier(s), or more specifically data carrier(s), e.g. computer program product(s), comprising the computer program(s). Each carrier may be one of an electronic signal, an optical signal, a radio signal, and a computer readable storage medium, e.g. a computer readable storage medium or media 2101 as schematically illustrated in the figure. The computer program(s) 2003 may thus be stored on such computer readable storage medium 2101. By carrier may be excluded a transitory, propagating signal and the data carrier may correspondingly be named non-transitory data carrier. Non-limiting examples of the data carrier(s) being computer readable storage medium or media is a memory card or a memory stick, a disc storage medium, or a mass storage device that typically is based on hard drive(s) or Solid State Drive(s) (SSD). The computer readable storage medium or media 2101 may be used for storing data accessible over a computer network 2102, e.g. the Internet or a Local Area Network (LAN). The computer program(s) 2003 may furthermore be provided as pure computer program(s) or comprised in a file or files. The file or files may be stored on the computer readable storage medium or media 2101 and e.g. available through download e.g. over the computer network 2102 as indicated in the figure, e.g. via a server. The file or files may e.g. be executable files for direct or indirect download to and execution on said device(s) 2000 to make it or them perform as described above, e.g. by execution by the processor(s) 2004. The file or files may also or alternatively be for intermediate download and compilation involving the same or another processor(s) to make them executable before further download and execution causing said device(s) 2000 to perform as described above.

Note that any processing module(s) and circuit(s) mentioned in the foregoing may be implemented as a software and/or hardware module, e.g. in existing hardware and/or as an Application Specific Integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make the node(s) and device(s) to be configured to and/or to perform the above-described methods and actions.

Identification by any identifier herein may be implicit or explicit. The identification may be unique in a certain context, e.g. in the wireless communication network or at least in a relevant part or area thereof.

The term "network node" or simply "node" as used herein may as such refer to any type of node that may communicate with another node in and be comprised in a communication network, e.g. IP network or wireless communication network. Further, such node may be or be comprised in a radio network node (described below) or any network node, which e.g. may communicate with a radio network node. Examples of such network nodes include any radio network node, a core network node, Operations & Maintenance (O&M), Operations Support Systems (OSS), Self Organizing Network (SON) node, etc.

The term "radio network node" as may be used herein may as such refer to any type of network node for serving a wireless communication device, e.g. a so called User Equipment or UE, and/or that are connected to other network node(s) or network element(s) or any radio node from which a wireless communication device receives signals from. Examples of radio network nodes are Node B, Base Station (BS), Multi-Standard Radio (MSR) node such as MSR BS, eNB, eNodeB, gNB, network controller, RNC, Base Station Controller (BSC), relay, donor node controlling relay, Base Transceiver Station (BTS), Access Point (AP), New Radio (NR) node, transmission point, transmission node, node in distributed antenna system (DAS) etc.

Each of the terms "wireless communication device", "wireless device", "user equipment" and "UE", as may be used herein, may as such refer to any type of wireless device arranged to communicate with a radio network node in a wireless, cellular and/or mobile communication system. Examples include: target devices, device to device UE, device for Machine Type of Communication (MTC), machine type UE or UE capable of machine to machine (M2M) communication, Personal Digital Assistant (PDA), tablet, mobile, terminals, smart phone, Laptop Embedded Equipment (LEE), Laptop Mounted Equipment (LME), Universal Serial Bus (USB) dongles etc.

While some terms are used frequently herein for convenience, or in the context of examples involving other a certain, e.g. 3GPP or other standard related, nomenclature, it must be appreciated that such term as such is non-limiting.

Also note that although terminology used herein may be particularly associated with and/or exemplified by certain communication systems or networks, this should as such not be seen as limiting the scope of the embodiments herein to only such certain systems or networks etc.

As used herein, the term "memory" may refer to a data memory for storing digital information, typically a hard disk, a magnetic storage, medium, a portable computer diskette or disc, flash memory, random access memory (RAM) or the like. Furthermore, the memory may be an internal register memory of a processor.

Also note that any enumerating terminology such as first device or node, second device or node, first base station, second base station, etc., should as such be considered non-limiting and the terminology as such does not imply a certain hierarchical relation. Without any explicit information in the contrary, naming by enumeration should be considered merely a way of accomplishing different names.

As used herein, the expression "configured to" may e.g. mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of unicasting, one specifically addressed device may receive and encode the transmission. In case of group-casting, e.g. multicasting, a group of specifically addressed devices may receive and decode the transmission.

When using the word "comprise" or "comprising" it shall be interpreted as nonlimiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method, performed by a device, for supporting performance of machine learning based crest factor reduction (CFR) and/or digital predistortion (DPD) on multiple digital input signals relating to different frequency bands, respectively, in order to signal condition said signals before power amplification and subsequent transmission in said frequency bands by a wireless communication network, the method comprising:

obtaining said multiple digital input signals as complex valued signals;

performing feature construction that takes said multiple digital input signals as input and provides constructed feature signals according to predefined constructed feature types as output, wherein said predefined constructed feature types relate to at least the following per complex valued sample of the obtained complex valued multiple digital input signals: a real part of the complex valued sample, an imaginary part of the complex valued sample, and at least one of an absolute value of the complex valued sample and a phase of the complex valued sample, applying CFR and/or DPD signal conditioning based on one or more trained machine learning models implementing said machine learning based CFR and/or DPD, wherein each of said trained machine learning models takes said constructed feature signals as input, and said trained machine learning models provide CFR and/or DPD first signal conditioned multiple digital output signals as output; and applying further DPD signal conditioning including a tracking DPD that operates on an error from said machine learning based DPD.

2. The method of claim 1, wherein said feature construction takes said multiple digital input signals as input and per present complex valued sample of each signal provides at least the following constructed feature signal samples as constructed feature output associated each present complex valued sample of the signal: the real part of the present sample, the imaginary part of the present sample and at least one of the absolute value of the present sample and the phase of the present sample.

3. The method of claim 2, wherein the feature construction for each of said present complex valued samples also considers one or more preceding complex valued samples and provides, for each such preceding complex valued sample, at least the following constructed feature signal samples as further output associated with said present complex valued sample: the real part of the preceding sample, the imaginary part of the preceding sample and at least one of the absolute value of the preceding sample and the phase of the preceding sample.

4. The method of claim 1, wherein the output of constructed feature signals corresponds to samples comprised in one or more 1-dimensional data structures with data grouped per digital input signal of said multiple digital input signal.

5. The method of claim 1, wherein the output of constructed feature signals corresponds to samples comprised in a 2-dimensional data structure with number of a total of samples considered for each digital input signal in a first dimension of the 2-dimensional data structure and the constructed feature signal samples for all the multiple digital input signals in a second dimension of the 2-dimensional data structure.

6. The method of claim 1, wherein the method further comprises:
applying said power amplification and said wireless transmission based on the signal conditioned multiple digital output signals, wherein said power amplification is performed with a single power amplifier for all of said different frequency bands.

7. The method of claim 1, wherein the CFR and/or DPD signal conditioning comprises both CFR and DPD.

8. The method of claim 7, wherein the CFR and DPD are separately and subsequently applied.

9. The method of claim 8, wherein the CFR operates on said received multiple digital input signals and provides CFR multiple digital output signals, wherein the DPD subsequently operates on said CFR multiple digital output signals and provides said signal conditioned multiple digital output signals.

10. The method of claim 9, wherein both the CFR and DPD are based on machine learning.

11. The method of claim 7, wherein the CFR and DPD are jointly applied with said one or more trained machine learning models being common for both the CFR and the DPD, wherein the jointly applied CFR and DPD operates on said received multiple digital input signals and provides said first signal conditioned multiple digital output signals.

12. The method of claim 11, wherein said one or more trained machine learning models that are common for both the CFR and the DPD additionally provide CFR signal conditioned multiple digital output signals to be used as input to said tracking DPD for the provision of said error.

13. The method of claim 1, wherein said CFR and/or DPD signal conditioning comprises said machine learning based DPD and providing DPD second signal conditioned multiple digital output signals as output.

14. A device for supporting performance of machine learning based crest factor reduction (CFR) and/or digital predistortion (DPD) on multiple digital input signals relating to different frequency bands, respectively, in order to signal condition said signals before power amplification and subsequent transmission in said frequency bands by a wireless communication network, the device configured to:
obtain said multiple digital input signals as complex valued signals; and
perform feature construction that takes said multiple digital input signals as input and provides constructed feature signals according to predefined constructed feature types as output, wherein said predefined constructed feature types relate to at least the following per complex valued sample of the obtained complex valued multiple digital input signals: a real part of the complex valued sample, an imaginary part of the complex valued sample, and at least one of an absolute value of the complex valued sample and a phase of the complex valued sample,
apply CFR and/or DPD signal conditioning based on one or more trained machine learning models implementing said machine learning based CFR and/or DPD, wherein each of said trained machine learning models takes said constructed feature signals as input, and said trained machine learning models provide CFR and/or DPD first signal conditioned multiple digital output signals as output; and
apply further DPD signal conditioning including a tracking DPD that operates on an error from said machine learning based DPD.

15. The device of claim 14, wherein said feature construction takes said multiple digital input signals as input and per present complex valued sample of each signal to provide at least the following constructed feature signal samples as constructed feature output associated each present complex valued sample of the signal: the real part of the present sample, the imaginary part of the present sample and at least one of the absolute value of the present sample and the phase of the present sample.

16. The device of claim 15, wherein the feature construction for each of said present complex valued samples also considers one or more preceding complex valued samples and to provide, for each such preceding complex valued sample, at least the following constructed feature signal samples as further output associated with said present complex valued sample: the real part of the preceding sample, the imaginary part of the preceding sample and at least one of the absolute value of the preceding sample and the phase of the preceding sample.

17. The device of claim 14, wherein the output of constructed feature signals corresponds to samples comprised in one or more 1-dimensional data structures with data grouped per digital input signal of said multiple digital input signal.

18. The device of claim 14, wherein the output of constructed feature signals corresponds to samples comprised in a 2-dimensional data structure with number of a total of samples considered for each digital input signal in a first dimension of the 2-dimensional data structure and the constructed feature signal samples for all the multiple digital input signals in a second dimension of the 2-dimensional data structure.

* * * * *